US007256680B2

(12) United States Patent
Konno et al.

(10) Patent No.: US 7,256,680 B2
(45) Date of Patent: Aug. 14, 2007

(54) REMOTE CONTROL APPARATUS FOR A SADDLE-TYPE VEHICLE

(75) Inventors: Takeshi Konno, Saitama (JP); Fuminori Kamemizu, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 297 days.

(21) Appl. No.: 10/963,419

(22) Filed: Oct. 11, 2004

(65) Prior Publication Data
US 2005/0103069 A1   May 19, 2005

(30) Foreign Application Priority Data
Oct. 15, 2003   (JP) .............................. 2003-355488

(51) Int. Cl.
*H04Q 1/00* (2006.01)
(52) U.S. Cl. ..................... 340/5.61; 340/427; 307/10.5
(58) Field of Classification Search ...... 340/5.61–5.64, 340/5.72, 426.16, 427, 10.1; 307/10.5; 180/219; 70/252
See application file for complete search history.

(56) References Cited

U.S. PATENT DOCUMENTS 5,124,565 A * 6/1992 Yoshida et al. ............ 340/5.61
5,634,358 A * 6/1997 Myers .......................... 70/233
6,515,580 B1 * 2/2003 Isoda et al. ............... 340/425.5
6,525,433 B1 * 2/2003 Enoyoshi et al. .......... 307/10.5
2003/0024754 A1 * 2/2003 Konno et al. ............... 180/287

FOREIGN PATENT DOCUMENTS

JP   2001278154 A   10/2001

* cited by examiner

*Primary Examiner*—Edwin C. Holloway, III
(74) *Attorney, Agent, or Firm*—Carrier, Blackman & Associates, P.C.; William D. Blackman; Joseph P. Carrier

(57) ABSTRACT

A remote control apparatus for a saddle-type vehicle such as a two-wheeled vehicle includes a transmission antenna for transmitting a signal to a normal portable transmitter carried by a vehicle user. The transmitted signal urges the portable transmitter to transmit an ID signal to a receiver positioned on the vehicle and operably connected to a handlebar lock module. The transmission antenna is disposed within the vehicle body cover at a position spaced away from the handlebar lock module. Upon receipt of the ID signal, a handlebar lock module provides a handlebar lock cancellation operation allowing operation of the vehicle. The invention greatly increases the degree of freedom in arrangement of the transmission antenna.

20 Claims, 21 Drawing Sheets

REMOTE CONTROL APPARATUS FOR A SADDLE-TYPE VEHICLE

CROSS-REFERENCE TO RELATED APPLICATIONS

The present invention claims priority under 35 USC 119 based on Japanese patent application No. 2003-355488, filed Oct. 15, 2003.

BACKGROUND OF THE INVENTION

1. Field of the Invention

This invention relates to a remote control apparatus for a saddle-type vehicle which includes a transmission antenna for transmitting a signal for urging a conventional portable transmitter carried by a vehicle user to transmit an ID signal, and a handlebar lock module having a knob for enabling at least starting operation of an engine and a handlebar lock cancellation operation in response to reception of an ID signal from the conventional portable transmitter.

2. Description of the Background Art

A light, two-wheeled scooter type vehicle that includes a remote control apparatus is known. For example, Japanese Laid-Open Patent No. 2001-278154 discloses a two wheeled, scooter type vehicle having a remote control apparatus. The referenced patent document discloses a remote control apparatus wherein an actuation knob of a handlebar lock module is disposed on the leg shield of the vehicle.

In such a remote control apparatus for a saddle-type vehicle as described in Japanese Patent Laid-Open No. 2001-278154, it is usually the case that a transmission antenna is provided on the handlebar lock module. Thus, upon transfer of a signal to and from a portable transmitter carried by a vehicle user, the remote control apparatus actuates the handlebar lock module. However, the position of the transmission antenna is restricted, and the degree of freedom in arrangement for disposing the transmission antenna is so restricted that it may limit output power of the transmission antenna.

It is an object of the present invention to provide a remote control apparatus for a saddle-type vehicle which increases the degree of freedom in arrangement of a transmission antenna.

SUMMARY OF THE INVENTION

In order to attain the object described above, according to the present invention, a remote control apparatus for a saddle-type vehicle is characterized in that the transmission antenna is disposed at a position spaced away from the handlebar lock module. The inventive remote control apparatus includes a transmission antenna for transmitting a signal to a conventional portable transmitter carried by a vehicle user. The transmitted signal urges the portable transmitter to transmit an ID signal to a handlebar lock module mounted on the vehicle. The remote control apparatus includes the handlebar lock module, which in turn includes a knob for actuating a steering handlebar locking mechanism and for enabling at least staffing operation of an engine. The remote control apparatus provides a handlebar lock cancellation operation in response to reception of an ID signal from the portable transmitter.

In the invention described above, the transmission antenna is disposed in a spaced relationship from the handlebar lock module. This spaced relationship provides a greatly improved degree of freedom in arrangement of the transmission antenna.

Modes for carrying out the present invention are explained below by reference to an embodiment of the present invention shown in the attached drawings. The above-mentioned object, other objects, characteristics and advantages of the present invention will become apparent form the detailed description of the embodiment of the invention presented below in conjunction with the attached drawings.

DETAILED DESCRIPTION OF THE INVENTION

In the following, an embodiment of the present invention is described with reference to a working example of the present invention shown in the accompanying drawings, FIGS. 1 to 21.

Figure 1:
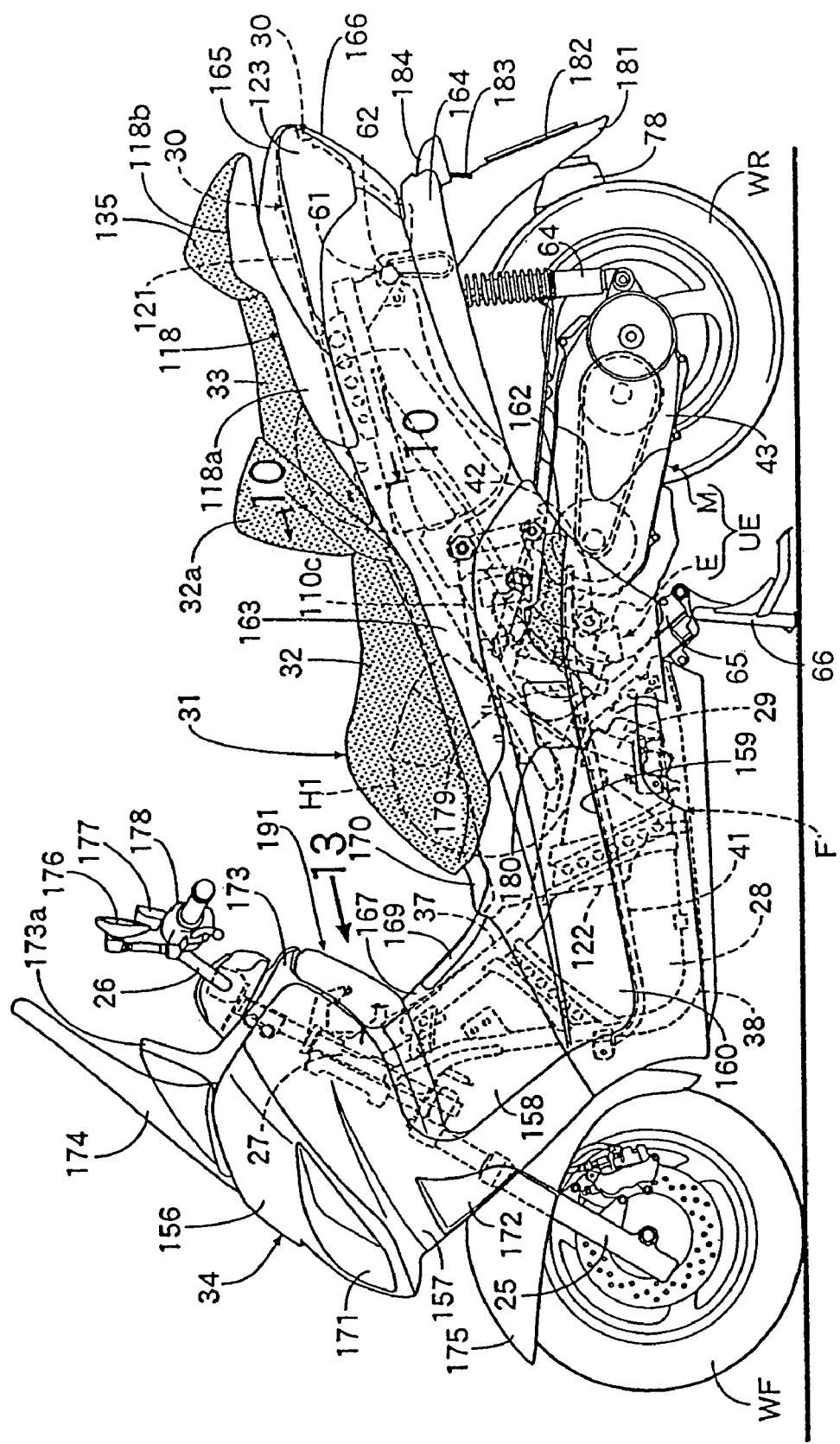
FIG. 1 is a left side elevational view of a two wheeled, scooter type vehicle.

Referring first to FIG. 1, a vehicle body frame F of a two wheeled, scooter type vehicle in the form of a motorcycle includes, at a front end thereof, a front fork 25 for supporting a front wheel WF for rotation thereon and a head pipe 27 for supporting a steering handlebar bar 26 connected to the front fork 25 for steering operation. A unit swing engine UE is supported for upward and downward rocking motion at an intermediate portion of the vehicle body frame F in the forward and rearward direction, and supports a rear wheel WR at a rear end thereof. A fuel tank 28, having an elongate form and lying upwardly and downwardly as viewed from the side, and a radiator 29 disposed rearwardly of the fuel tank 28, are carried on the vehicle body frame F in front of the unit swing engine UE. Further, a storage box 30 is attached to the vehicle body frame F in such a manner as to overlie the unit swing engine UE from above, and a riding seat 31 formed as a seat of the tandem type having a front seat 32 and a rear seat 33 is disposed on the storage box 30. Furthermore, a vehicle body cover 34 made of a synthetic resin material is attached to the vehicle body frame F and covers over the vehicle body frame F, a front portion of the unit swing engine UE, the fuel tank 28, the radiator 29 and the storage box 30.

Figure 2:
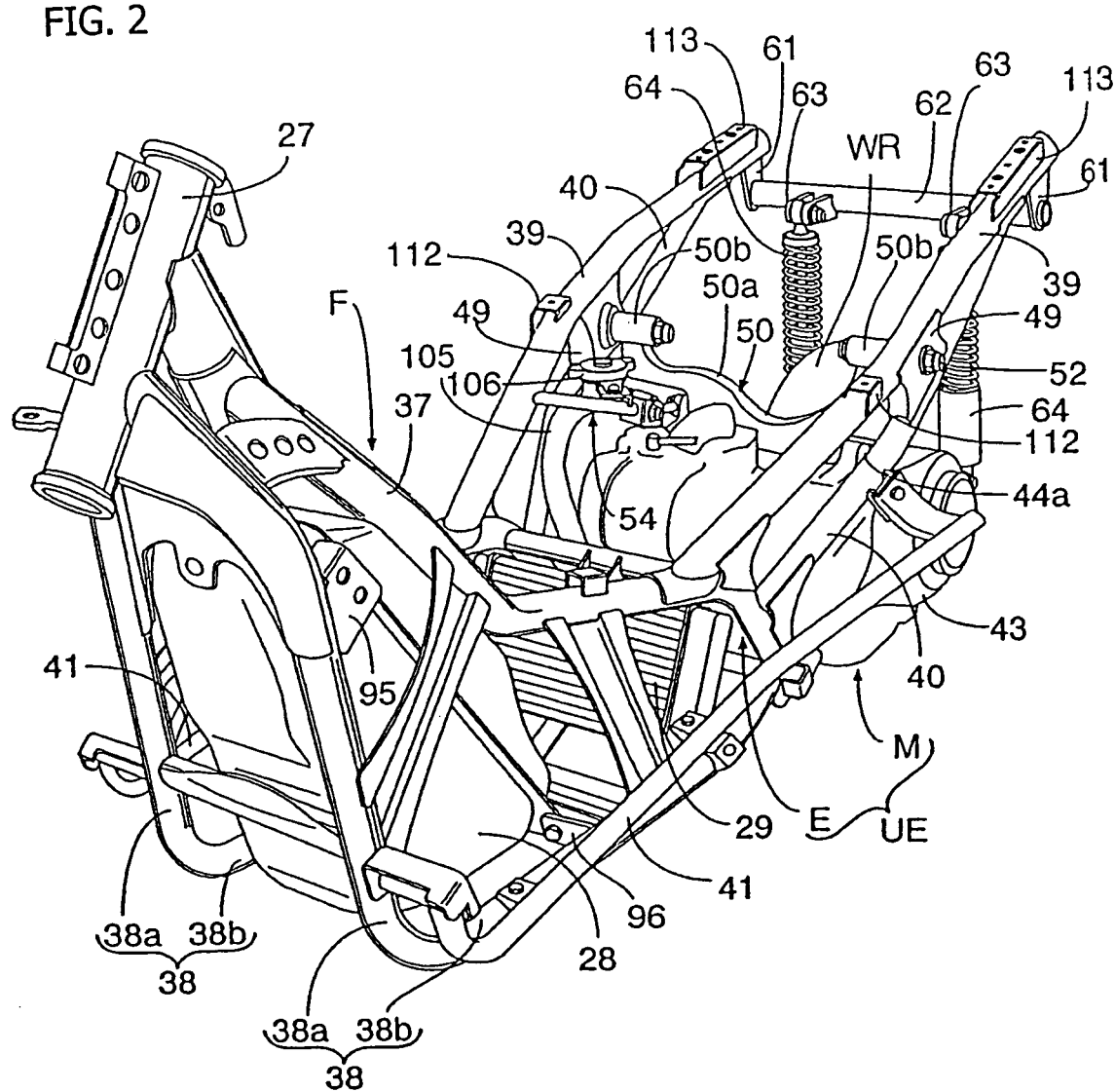
FIG. 2 is a front perspective view of an isolated vehicle body frame from the two wheeled vehicle of FIG. 1 showing the frame configuration and including a fuel tank and a radiator attached thereto.
Figure 3:
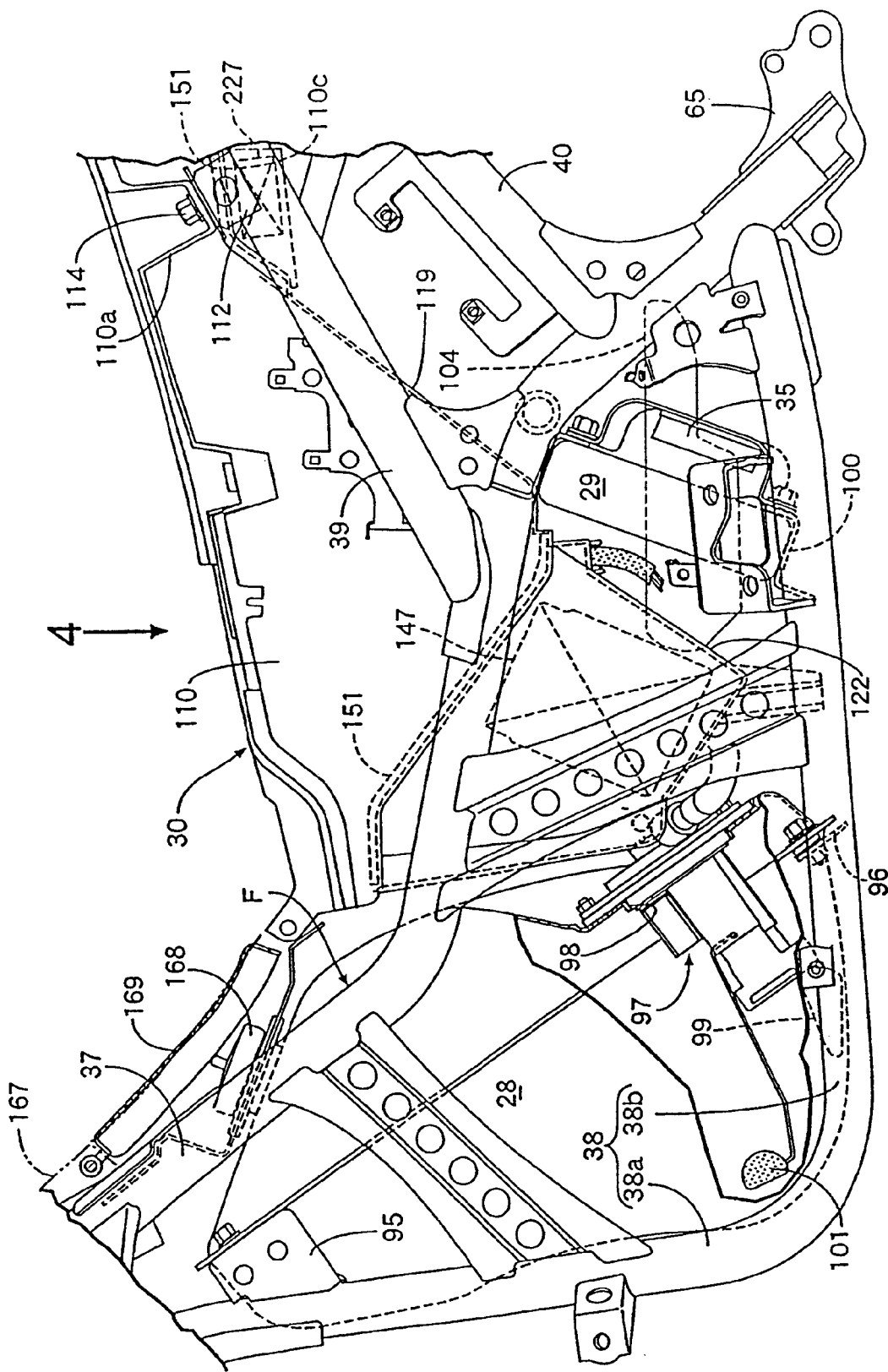
FIG. 3 is a left side elevational view of an intermediate portion in a forward and rearward direction of the scooter type vehicle in which the riding seat and the vehicle body cover are removed, showing the orientation of the fuel tank within the frame.

Referring also to FIGS. 2 and 3, the vehicle body frame F includes the head pipe 27, a pair of left and right upper down frames 37 connected to the head pipe 27 and extending rearwardly downwards, and a pair of left and right lower down frames 38, 38. The lower down frames 38, 38 include inclined portions 38a and horizontal portions 38b. The inclined portions 38a are connected to the head pipe 27 below the upper down frames 37 and extending rearwardly downwards. The horizontal portions 38b are connected integrally to rear ends of the inclined portions 38a. Further, the lower down frames 38, 38 are welded at rear ends thereof to rear end portions of the upper down frames 37. The vehicle body frame F further includes a pair of left and right seat rails 39, 39 extending rearwardly upwards from intermediate portions of the upper down frames 37, and a pair of left and right rear frames 40, 40 for interconnecting rear portions of the upper down frames 37, and rear portions of the seat rails 39, 39. The vehicle body frame F further includes a pair of left and right support frames 41, 41 disposed outwardly and to the side of the upper down frames 37, lower down frames 38, and rear frames 40, 40, and extending forwardly and rearwardly.

Step floors 159 are provided on the left and right of the vehicle body cover 34 and are supported from below by the two support frames 41, 41. Front ends of the support frames 41 are coupled to lower portions of the inclined portions 38a of the lower down frames 38, while rear ends of the support frames 41 are coupled to intermediate portions of the rear frames 40.

Figure 4:
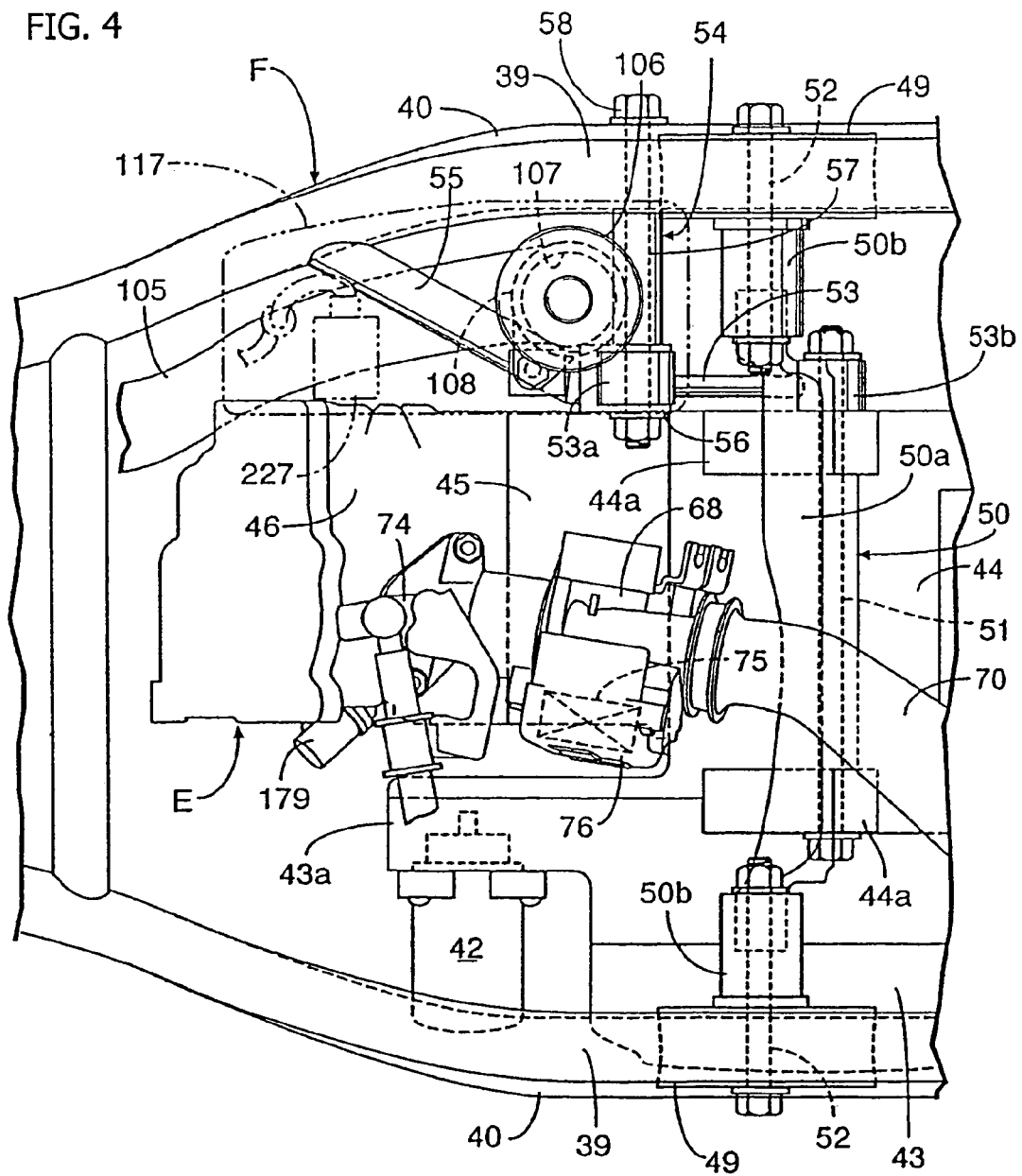
FIG. 4 is a view as viewed in the direction of an arrow mark 4 of FIG. 3 wherein the storage box is removed, showing the interrelationship between the engine and the frame.
Figure 5:
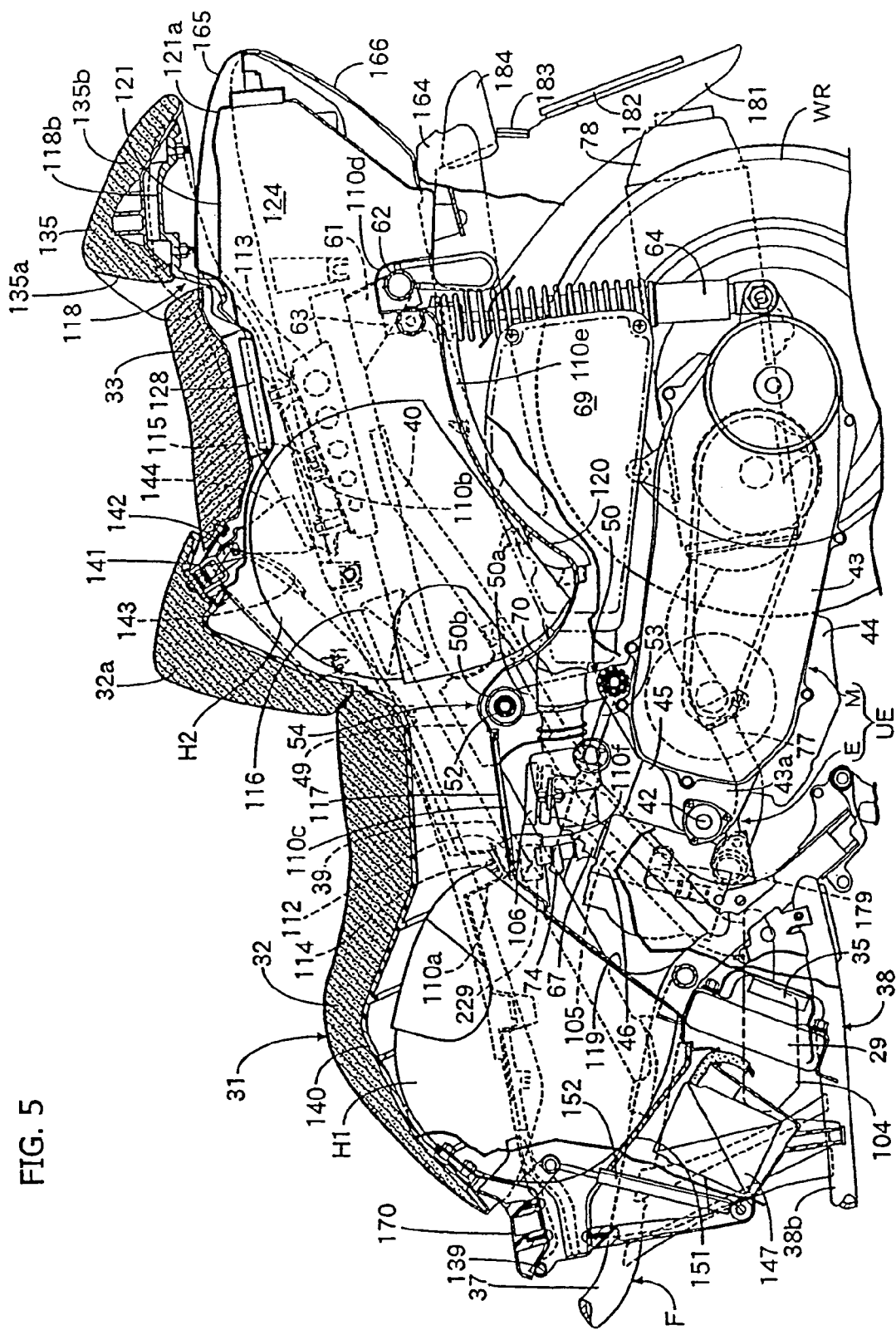
FIG. 5 is an enlarged vertical sectional side elevational view of a rear portion of the scooter type vehicle showing the storage box extending beneath both the front and rear portions of the seat.
Figure 6:
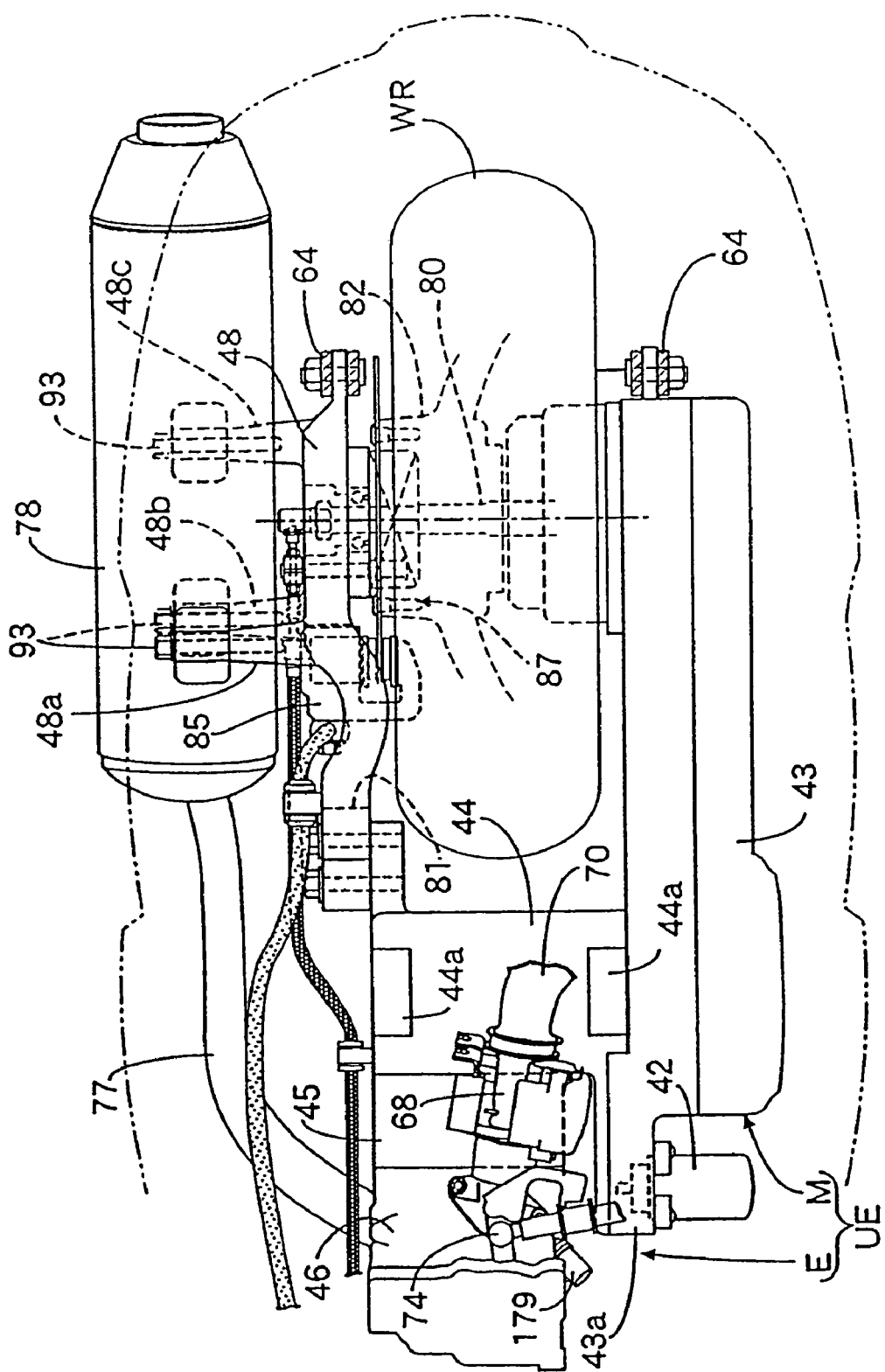
FIG. 6 is a top view showing the relative arrangement of a unit swing engine, a swing arm, a muffler, and a rear wheel.

Referring also to FIGS. 4 to 6, the unit swing engine UE includes an engine E of the water cooled type having a cylinder axis extending substantially horizontally. The unit swing engine UE also includes a continuously variable transmission M of the belt type for transmitting to the rear wheel WR output power of the engine E at a continuously variable speed by means of a transmission belt and pulleys. The continuously variable transmission M drives a movable pulley on the crankshaft side in response to operation of an electric motor 42 for speed change to continuously vary the transmission gear ratio.

A transmission case 43 of the continuously variable transmission M is connected to the left side of a crankcase 44 of the engine E such that it projects to the left side from the engine E, and extents to the left side of the rear wheel WR. A swing arm 48 is coupled at a front end portion thereof to the right side of the crankcase 44, and the rear wheel WR is supported for rotation between a rear end portion of the transmission case 43 and a rear end portion of the swing arm 48.

Incidentally, the electric motor 42 for speed change is disposed to the left of a cylinder 45 of the engine E and in front of the continuously variable transmission M. The electric motor 42 is attached to a front projection 43a of the transmission case 43 with an axis of rotation thereof directed in a widthwise direction of the vehicle body. Additionally, the electric motor 42 is disposed below a left side one of a pair of left and right passenger steps 162 provided on the vehicle body cover 34 and is disposed such that it is positioned below the left side one of the support frames 41, which forms part of the vehicle body frame F, as viewed from the side.

A pair of brackets 49, 49 are provided between intermediate portions of the seat rails 39, and the rear frames 40 of the vehicle body frame F. A pair of supporting projections 44a, 44a are provided in a projecting manner on an upper face of the crankcase 44 of the engine E. A link 50 includes a link tube portion 50a extending in the widthwise direction of the vehicle body and a pair of cylindrical supporting tube portions 50b, 50b provided integrally on and coaxially with the link tube portion 50a at the opposite ends of the link tube portion 50a. The supporting projections 44a, 44a and the link tube portion 50a are connected to each other by a connecting shaft 51 in the form of a bolt. Further, the supporting tube portions 50b, 50b at the opposite ends of the link 50 are supported for turning motion on the brackets 49, 49 through pivots 52, 52 extending in parallel to the connecting shaft 51. In other words, the unit swing engine UE is supported for rocking motion around the axial line of the pivots 52, 52 on the vehicle body frame F.

A tension rod 53 is provided between the engine E and the vehicle body frame F, and connecting portions 53a, 53b, each in the form of a ring, are provided at the opposite ends of the tension rod 53. The connecting portion 53a, located at one end of the tension rod 53, is connected for turning motion to an attaching portion 54 provided on the seat rail 39 and the rear frame 40 on the right side of the vehicle body frame F. The connecting portion 53b, located at the other end of the tension rod 53, is connected for rotation to the right end of the connecting shaft 51 which connects the crankcase 44 to the link 50.

The attaching portion 54 includes a support tube 55 extending obliquely rearwardly downwards from a front portion of the right side seat rail 39, a bracket 56 fixedly mounted at the rear end of the support tube 55 and having a substantially U-shape open rearwardly, and a connecting tube 57 for interconnecting the rear frame 40 on the right side and the bracket 56. The connecting portion 53a at the one end of the tension rod 53 is supported for pivotal motion on the attaching portion 54 by means of a bolt 58 extending through the bracket 56 and the connecting tube 57 and secured to the vehicle body frame F.

A pair of support plates 61, 61 are fixedly mounted at rear ends of the seat rails 39 of the vehicle body frame F such that they extend downwardly. Rear shock absorbers 64, 64 are connected at upper end portions thereof to a pair of brackets 63, 63 provided on a support pipe 62 serving as an attaching portion provided between the support plates 61, 61. Lower end portions of the rear shock absorbers 64, 64 are connected to a rear end portion of the transmission case 43 and a rear end portion of the swing arm 48.

Brackets 65 are attached to rear ends, that is, lower ends, of the two upper down frames 37, and a main stand 66 is supported for pivotal motion on the brackets 65. If the main stand 66 is erected uprightly, then the scooter type vehicle can stand independently with the rear wheel WR lifted as seen in FIG. 1. When the scooter type vehicle is to be operated, the main stand 66 is retracted so that the rear wheel WR contacts the ground.

A throttle body 68 is connected at a downstream end thereof to an upper face of the cylinder head 46 of the engine E through an intake pipe 67 which is curved toward the rear side from the cylinder head 46. The throttle body 68 is connected at an upstream end thereof to an air cleaner 69 through a connecting pipe 70 which passes above the link tube portion 50a of the link 50. The air cleaner 69 is disposed above the continuously variable transmission M of the unit swing engine UE.

A fuel injection valve 74 is attached to the intake pipe 67. A control box 76 is attached to the throttle body 68 and accommodates a controller 75 for controlling the ignition timing of the engine E and the fuel injection amount of the fuel injection valve 74.

An exhaust pipe 77 is connected to a lower face of the cylinder head. The exhaust pipe 77 is connected to an exhaust muffler 78 disposed on the right side of the swing arm 48 as shown in FIG. 7.

Figure 7:
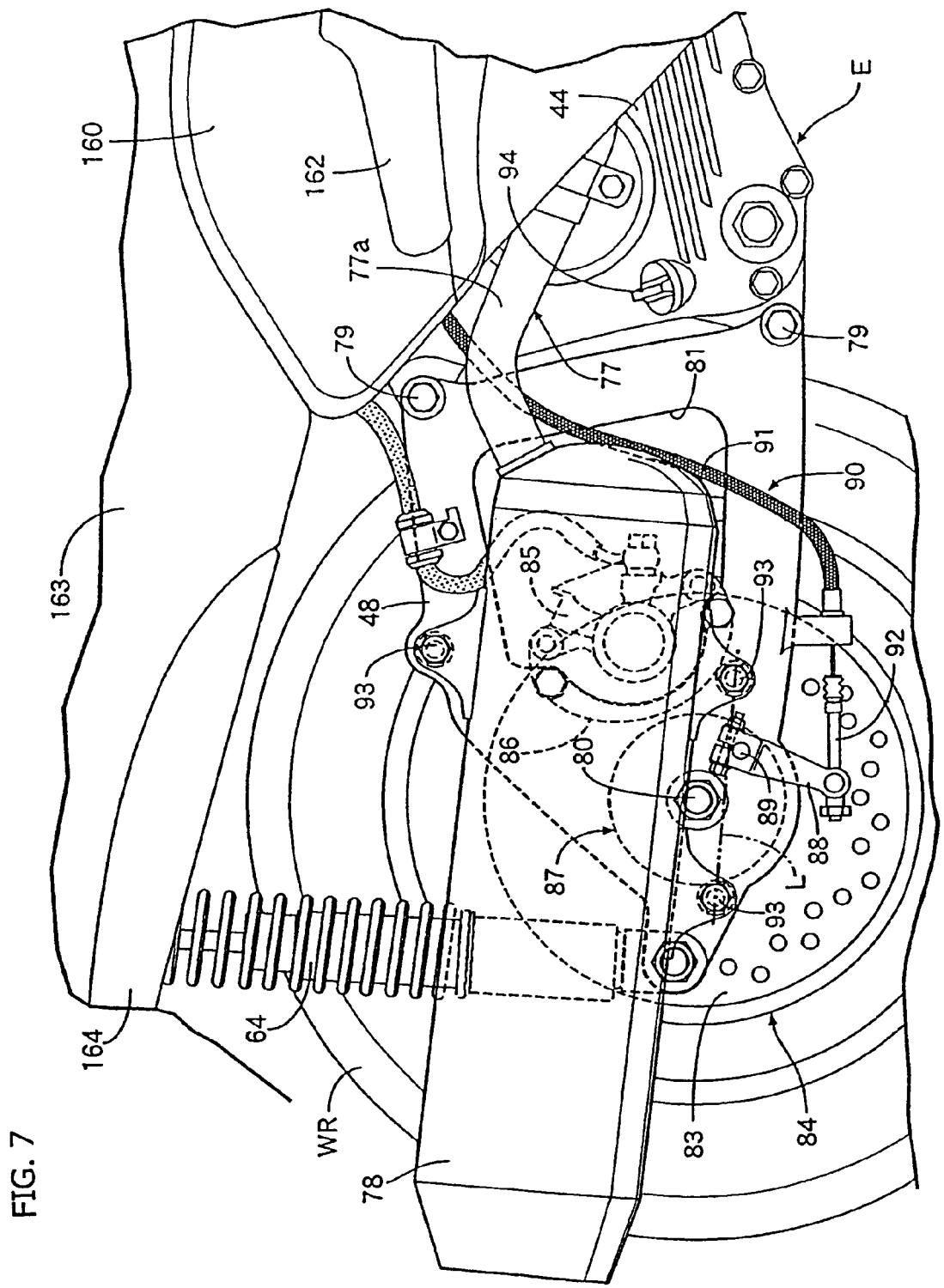
FIG. 7 is a right side elevational view of a rear portion of the scooter type vehicle, showing the shock absorber secured to the swing arm, and showing the exhaust muffler secured to the swing arm in two places.

Still referring to FIG. 7, the swing arm 48 is formed so as to have a substantially triangular shape which is narrowed on the rear end side thereof as viewed from the side. The swing arm 48 is fastened to the crankcase 44 of the engine E at two upper and lower locations at a front portion of the swing arm 48 by means of bolts 79, 79. An axle 80 of the rear wheel WR is supported at a rear portion of the swing arm 48, and the rear shock absorber 64 is connected at a lower end thereof to a rear end of the swing arm 48 rearwardly of the axle 80.

An opening 81 is provided substantially at a middle portion of the swing arm 48, and a brake caliper 85 of a rear brake 84 is disposed in the opening 81. The rear brake 84 is a disk brake which includes a brake disk 83 attached to a hub 82 of the rear wheel WR. A caliper bracket 86 is fixedly mounted on the swing arm 48, and the brake caliper 85 is secured to the caliper bracket 86.

Additionally, the opening 81 is formed such that the upward and downward dimension thereof decreases rearwardly, and the brake caliper 85, disposed at a rear portion of the opening 81, is secured to the caliper bracket 86 fixedly mounted on the swing arm 48 rearwardly of the opening 81.

A drum brake 87 is used as a parking brake and is mounted on the hub 82 of the rear wheel WR. A lever 88 for operating the drum brake 87 for braking is disposed outwardly of the swing arm 48. The lever 88 is fixedly mounted at a base end thereof to a pivot shaft 89, which extends for pivotal motion through the swing arm 48 into the drum brake 87. Meanwhile, an outer cable 91 provided in a brake cable 90 is supported at an end portion thereof to a lower portion of the swing arm 48. An end portion of an inner cable 92 projects from an end portion of the outer cable 91 and is connected to a free end portion of the lever 88.

Three support bosses 48a, 48b and 48c (FIG. 6) are provided integrally in a projecting manner on the swing arm 48 such that they project to the outer side. The exhaust muffler 78 is fastened to the support bosses 48a to 48c by means of bolts 93 and is disposed outwardly and to the side of the swing arm 48 in such a manner as to cover from the outside the brake caliper 85 disposed in the opening 81. Additionally, the brake caliper 85 is disposed between the support bosses 48a, 48b from among the support bosses 48a to 48c so that the brake caliper 85 is protected by the support bosses 48a, 48b.

A lower portion of the exhaust muffler 78 is mounted on both the front and rear sides of the axle 80 of the rear wheel WR below the exhaust muffler 78 and among the support bosses 48a to 48c. In particular, the lower portion of the exhaust muffler 78 is fastened at two locations which are on opposed front and rear sides of the axle 80. The fastening portions of both the axle 80, and the rear cushion 64 to the swing arm 48, are disposed between a straight line L interconnecting the fastening portions of the exhaust muffler 78, and the exhaust muffler 78 itself.

Incidentally, a level gauge 94 is disposed at a lower portion of the crankcase 44 in the proximity of the connecting portion of the exhaust muffler 78 to the exhaust pipe 77. The level gauge 94 detects the oil level in the crankcase 44 provided on the engine E. In order to prevent interference of the exhaust pipe 77 in the proximity of the connecting portion thereof to the exhaust muffler 78 with the level gauge 94, a curved portion 77a is formed on the exhaust pipe 77 such that it is curved in an upwardly convex state.

Fuel from the fuel tank 28 is supplied to the fuel injection valve 74 for injecting fuel toward the engine E. The fuel tank 28 is installed in a space defined by the pair of left and right upper down frames 37 and the pair of left and right lower down frames 38 of the vehicle body frame F, and is positioned immediately rearwardly of the front wheel WF. Additionally, the fuel tank 28 is formed such that it extends upwardly and downwardly from a location rearwardly of a lower portion of the head pipe 27 to lower portions of the lower down frames 38, 38.

Attaching plates 95 for fastening an upper portion of the fuel tank 28 are welded to the inclined portions 38a of the lower down frames 38 and attaching plates 96 for fastening a lower portion of the fuel tank 28 are welded to the horizontal portions 38b of the lower down frames 38.

A pump unit 97 is accommodated at a lower portion in the fuel tank 28. The pump unit 97 is attached to the fuel tank 28 along the rear face side of the fuel tank 28 such that it is inserted into the fuel tank 28 through an attaching hole 98 provided in the rear face of a lower portion of the fuel tank 28.

Additionally, the pump unit 97 is attached to the fuel tank 28 in a posture wherein an axis of rotation thereof is inclined forward and downward. A fuel filter 99 is provided for the pump unit 97 such that it sucks fuel in the fuel tank 28 and is disposed at a lowermost portion in the fuel tank 28. A float 101 extends within the fuel tank 28 from the pump unit 97 and moves upward and downward in response to the fuel amount in the fuel tank 28. The remaining amount of fuel detected by the float 101 is transmitted to the controller 75 in the control box 76 attached to the throttle body 68.

The radiator 29 has a radiator fan 35 and is disposed at a position spaced rearwardly from the fuel tank 28. The radiator 29 is supported by rear portions of the horizontal portions 38b of the lower down frames 38 of the vehicle body frame F and a support frame 100. The support frame 100 is provided between rear portions of the upper down frames 37 of the vehicle body frame F.

A reservoir tank 104 is connected to the radiator 29 and disposed below the right side step floor of one of the pair of left and right step floors 159 provided on the vehicle body cover 34. A hose 105 is connected to the reservoir tank 104 and extends upwardly. The hose 105 is connected at an upper end thereof to a water supply port forming member 108 which forms a water supply port 107, which is opened and closed with a cap 106.

Additionally, the water supply port forming member 108 is supported by the attaching portion 54 of the tension rod 53. Tension rod 53 is provided between the vehicle body frame F and the unit swing engine UE. In other words, the water supply port forming member 108 is supported on the support tube 55 which extends obliquely rearwardly downwards from a front portion of the right side seat rail 39 and forms part of the attaching portion 54.

Figure 8:
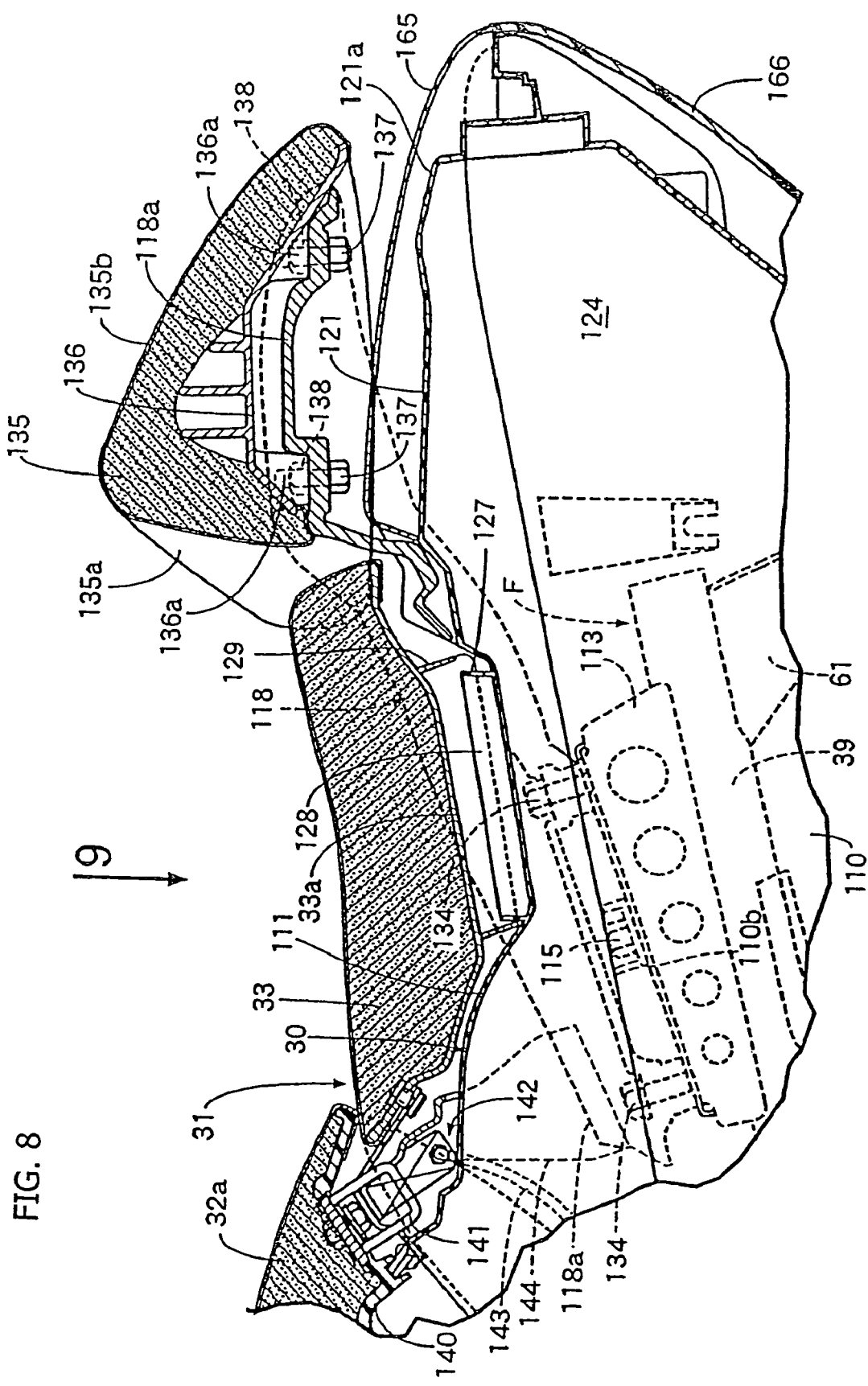
FIG. 8 is a vertical sectional view of a portion of the storage box in the proximity of a rear portion of the same.
Figure 9:
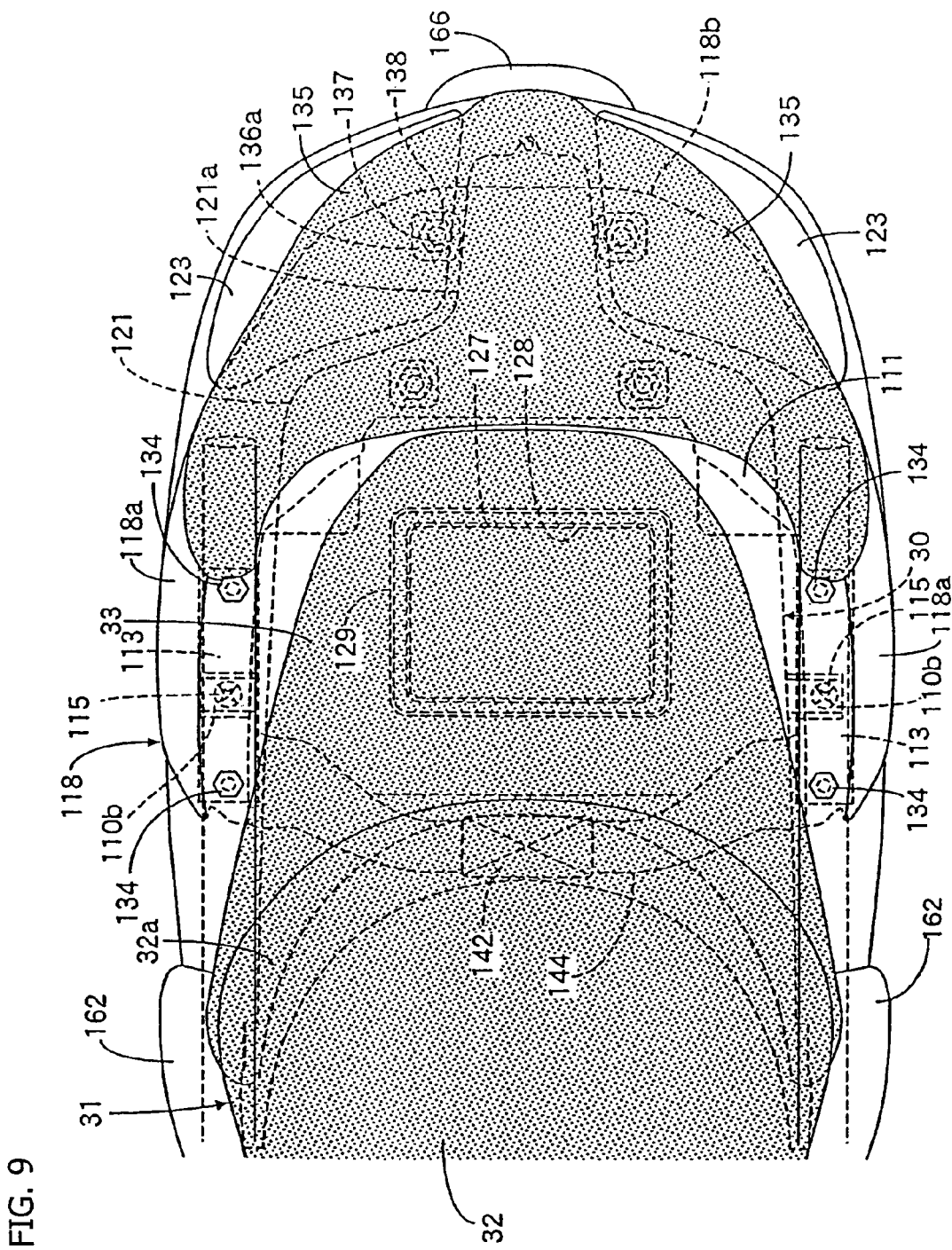
FIG. 9 is a view as viewed in the direction of an arrow mark 9 of FIG. 8.

Referring now to FIGS. 5, 8 and 9, the storage box 30 is disposed among rear portions of the upper down frames 37, the seat rails 39, and the rear frames 40, of the vehicle body frame F. The storage box 30 includes a box body 110 open at an upper end thereof, and an upper face cover 111 coupled to the box body 110 in such a manner as to cover a rear portion of the box body 110 from above. The storage box 30 is disposed below the riding seat 31 such that it extends from a location below the front end of the riding seat 31 to another location in the proximity of upper portions of the rear shock absorbers 64.

In order to support the storage box 30 on the vehicle body frame F, front supporting members 112 are welded at intermediate portions of the pair of seat rails 39, 39 of the vehicle body frame F and rear supporting members 113, elongated forwardly and rearwardly, are welded to rear portions of the seat rails 39 (FIG. 2). Front and rear supporting members 112, 113 are used to secure box body 110 as follows: Front attaching portions 110a of box body 110 confront the front supporting members 112, and rear attaching portions 110b of box body 110 confront intermediate portions (in the longitudinal direction) of the rear supporting members 113. Front attachment portions 110a and rear attachment portions 110b are provided at upper portions of the opposite sides of the box body 110 of the storage box 30. The front attaching portions 110a are fastened to the front supporting members 112 by means of bolts 114, while the rear attaching portions 110b are fastened to the rear supporting members 113 by means of bolts 115.

Figure 11:
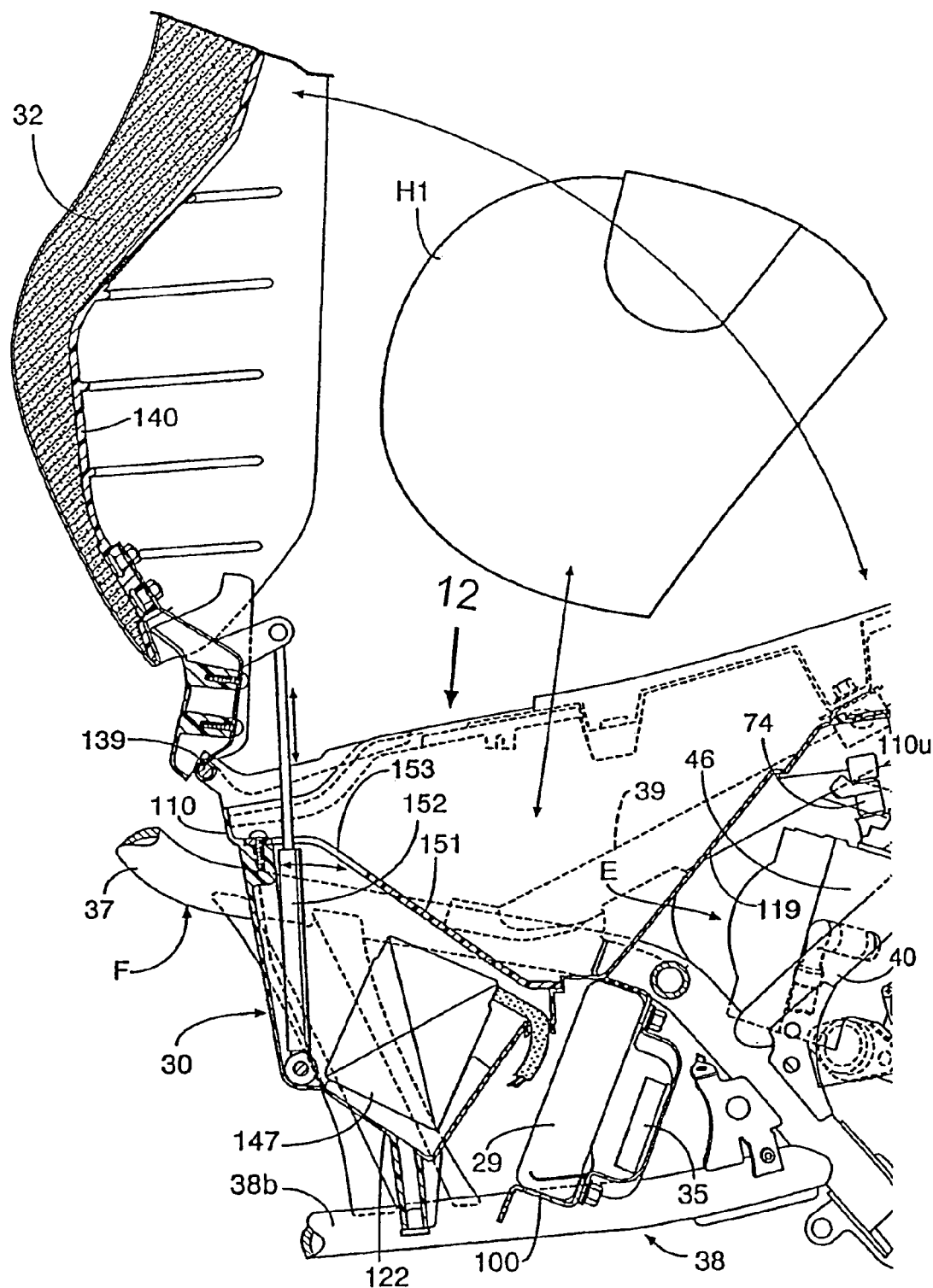
FIG. 11 is an enlarged view of the front seat portion of FIG. 5 in a state wherein a front seat is open.

A front helmet accommodation portion 119, a rear helmet accommodation portion 120 and a substantially flat shallow bottom portion 110c are formed on a bottom wall of the storage box 30, that is, a bottom wall of the box body 110 (FIGS. 5 and 11). The front helmet accommodation portion 119 is disposed below the front seat 32 so that a helmet H1 is accommodated into the front helmet accommodation portion 119. The rear helmet accommodation portion 120 is disposed below the rear seat 33 so that a second helmet H2 is accommodated into the rear helmet accommodation portion 120.

The shallow bottom portion 110c is disposed between the front helmet accommodation portion 119 and the rear helmet accommodation portion 120. The front and rear helmet accommodation portions 119 and 120 are formed in a downwardly enlarged shape. Additionally, a front edge of the upper face cover 111 of the storage box 30 is formed so as to have an arcuate shape enlarged rearwardly as viewed from above so as to permit the helmet H2 to be accommodated into the rear helmet accommodation portion 120. A light source 116 for illuminating the inside of the storage box 30 is attached to an inner side face of the box body 110 at a location corresponding to a front portion of the upper face cover 111.

The throttle body 68 and the fuel injection valve 74 are disposed below the shallow bottom portion 110c of the storage box 30 such that the positions of the upper ends thereof are substantially at the same height. Further, the water supply port 107 of the reservoir tank 104 is disposed below the shallow bottom portion 110c. An opening is provided within the shallow bottom portion 110c overlying the water supply port 107. A first maintenance lid 117 is attached over the opening in such a manner so as to allow opening and closing movement of first maintenance lid 117.

A rear enlarged portion 121 is provided at a rear portion of the storage box 30 and is enlarged rearwardly farther than the rear ends of the support pipe 62, which serves as an attaching portion of the rear shock absorbers 64, 64 to a rear portion of the vehicle body frame F, and the rear seat 33. The rear enlarged portion 121 is enlarged rearwardly to a position substantially same as the position of the rear end of a grab rail 118 disposed around the rear seat 33. Additionally, a reduced width portion 121a is provided at a middle portion of a rear portion of the rear enlarged portion 121 such that it extends into a space between left and right tail lamp units 123, 123 as viewed from above.

A lower portion of the rear enlarged portion 121 is disposed below the support pipe 62 which serves as an attaching portion of upper portions of the rear shock absorbers 64, 64 to rear portions of the vehicle body frame F. Thus, an enlarged portion 110d corresponding to the attaching portion of an upper portion of the rear shock absorber 64 to the vehicle body frame F is formed by partly enlarging the bottom wall of the storage box 30, that is, the bottom wall of the box body 110. A container portion 124 is formed in the rear enlarged portion 121 such that the enlarged portion 110d is interposed between the rear helmet accommodation portion 120 and the container portion 124.

The rear seat 33 of the riding seat 31 is formed in such a manner as to cover the front portion side of the storage box 30 with respect to the upper face cover 111. The front edge of the rear seat 33 is formed in an arc enlarged rearwardly as viewed from above in conformity with the front edge of the upper face cover 111.

Figure 10:
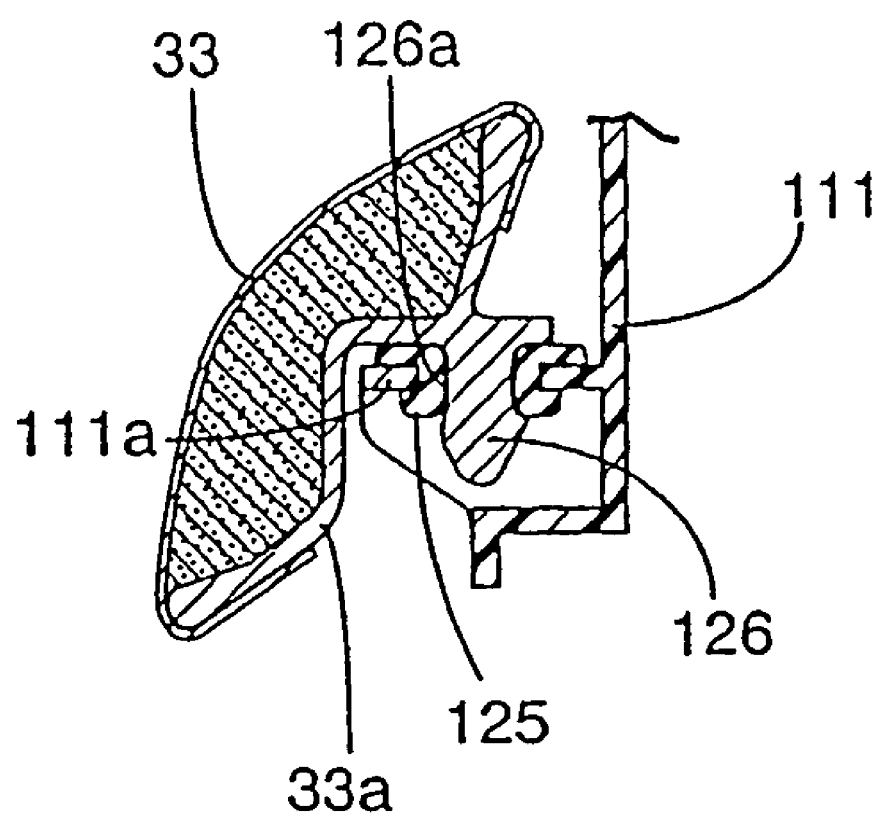
FIG. 10 is an enlarged sectional view taken along line 10-10 of FIG. 1 showing the resilient latching means used to removably secure the rear seat to the upper face cover of the storage box.

Referring to FIG. 10, the rear seat 33 is removably mounted on the upper face cover 111 of the storage box 30. Receiving plate portions 111a are provided integrally on the opposite sides of a front portion of the upper face cover 111 such that they project to the side. Resilient rings 125 made of a resilient substance are individually mounted on the receiving plate portions 111a. Fitting projections 126 are provided integrally in a projecting manner on a bottom plate 33a of the rear seat 33. The fitting projections 126 have annular recesses 126a provided on outer peripheries thereof for resiliently engaging with the resilient rings 125. The rear seat 33 is removably mounted on the upper face cover 111 by inserting the fitting projections 126 into openings in receiving plate portions 111 a so as to pass through resilient rings 125. The annular recesses 126a resiliently engage with the resilient rings 125 in which the fitting projections 126 are fitted.

A first rib 127 having a quadrangular ring shape projects upward from an upper face of the upper face cover 111. An accommodation space 128 is formed on the upper face of the upper face cover 111 as defined by the area surrounded by the first rib 127. It is accessable upon engagement and disengagement of the rear seat 33. A second rib 129 having a quadrangular ring shape projects from the bottom plate 33a of the rear seat 33 so as to surround the first rib 127. A labyrinth structure surrounding the accommodation space 128 is formed by this configuration of the first and second ribs 127, 129.

The grab rail 118 is made of metal and has gripping portions 118a, 118a integrally disposed on opposed sides of the rear seat 33. Gripping portions 118a, 118a extend forward and rearward. A connecting portion 118b interconnectings interconnects the respective rear ends of the gripping portions 118a. The gripping portions 118a are fastened at two places at the front portions thereof to the rear supporting members 113 by means of bolts 134 which sandwich the fastening portions of the storage box 30 to the rear supporting members 113 from forward and backward. The rear supporting members 113 are welded to rear portions of the seat rail 39 of the vehicle body frame F.

The connecting portion 118b is provided integrally and contiguously to the rear ends of the gripping portions 118a such that it is disposed at a position spaced upwardly from an upper portion of the rear enlarged portion 121 of the storage box 30 and at a height substantially equal to the upper face of the rear seat 33. A back rest 135 is removably attached to the connecting portion 118b. The back rest 135 supports from the rear the waist portion of a passenger seated on the rear seat 33.

In particular, a plurality of leg portions 136a are provided integrally in a projecting manner on a bottom plate 136 of the back rest 135 such that they contact with the connecting portion 118b of the grab rail 118. Nuts 138 are individually implanted on the leg portions 136a. By screwing and tightening bolts 137, which are inserted from below the connecting portion 118b of the grab rail 118, to the nuts 138, the back rest 135 is removably attached to an upper face of a rear portion of the grab rail 118, that is, an upper face of the connecting portion 118b.

Additionally, the back rest 135 has a forward and downwardly inclined front inclined face 135a and a rearward and downwardly inclined rear inclined face 135b, as viewed from the side, on an upper face thereof such that it is formed in a substantially streamline shape while the width thereof gradually decreases rearwardly as viewed from above. The grab rail 118 and the back rest 135 overlap with each other at almost all portions thereof as viewed from above.

The front seat 32 of the riding seat 31 has a back rest portion 32a provided integrally at a rear portion thereof. The back rest portion 32a is enlarged upwardly so that it supports from the rear the waist portion of the driver seated on the front seat 32. The front seat 32 is disposed on the storage box 30 such that it covers the front opening of the storage box 30, which is not covered with the upper face cover 111, from above. The front seat 32 is connected at a front end portion thereof to the front end of the storage box 30 by a hinge pin 139. In other words, the front end portion of the front seat 32 is supported on the storage box 30 in a manner which allows upward and downward opening and closing movement of the front seat 32.

A substantially U-shaped striker 141 (FIGS. 8 and 12) is attached to a rear portion of a bottom plate 140 of the front seat 32. A seat latch 142 is disposed among a front portion of the upper face cover 111 of the storage box 30 and front portions of the front and rear seats 32 and 33 at a position corresponding to a central portion in the widthwise direction of the rear seat 33. The seat latch 142 can perform changeover between a seat catch state wherein it grips the striker 141 to hold the front seat 32 in the closed state, and a seat catch releasing state wherein it cancels the gripping of the striker 141 to allow opening and closing movement of the front seat 32. The seat latch 142 is configured such that when the front seat 32 which is in an upwardly open state is moved downwardly to close the front opening of the storage box 30, the seat latch 142 engages with the striker 141 to establish a seat catching state. The seat latch 142 is changed over from the seat catching state to a seat catch releasing state by a pulling action of a motion transmitting cable 143.

The seat latch 142 is provided on a bridge plate 144 made of metal and provided between the front ends of the gripping portions 118a of the grab rail 118. The bridge plate 144 is configured such that it extends from the front ends of the gripping portions 118a to a space between the upper face cover 111 and the rear seat 33 and then extends along an upper face of a front portion of the upper face cover 111.

A cover 146 is attached to a front portion of a middle portion in the widthwise direction of the rear seat 33 such that it overlies the seat latch 142 from above when the front seat 32 is in an open state. The cover 146 has a recess 145 (refer to FIG. 12) into which the striker 141 is removably inserted.

Figure 12:
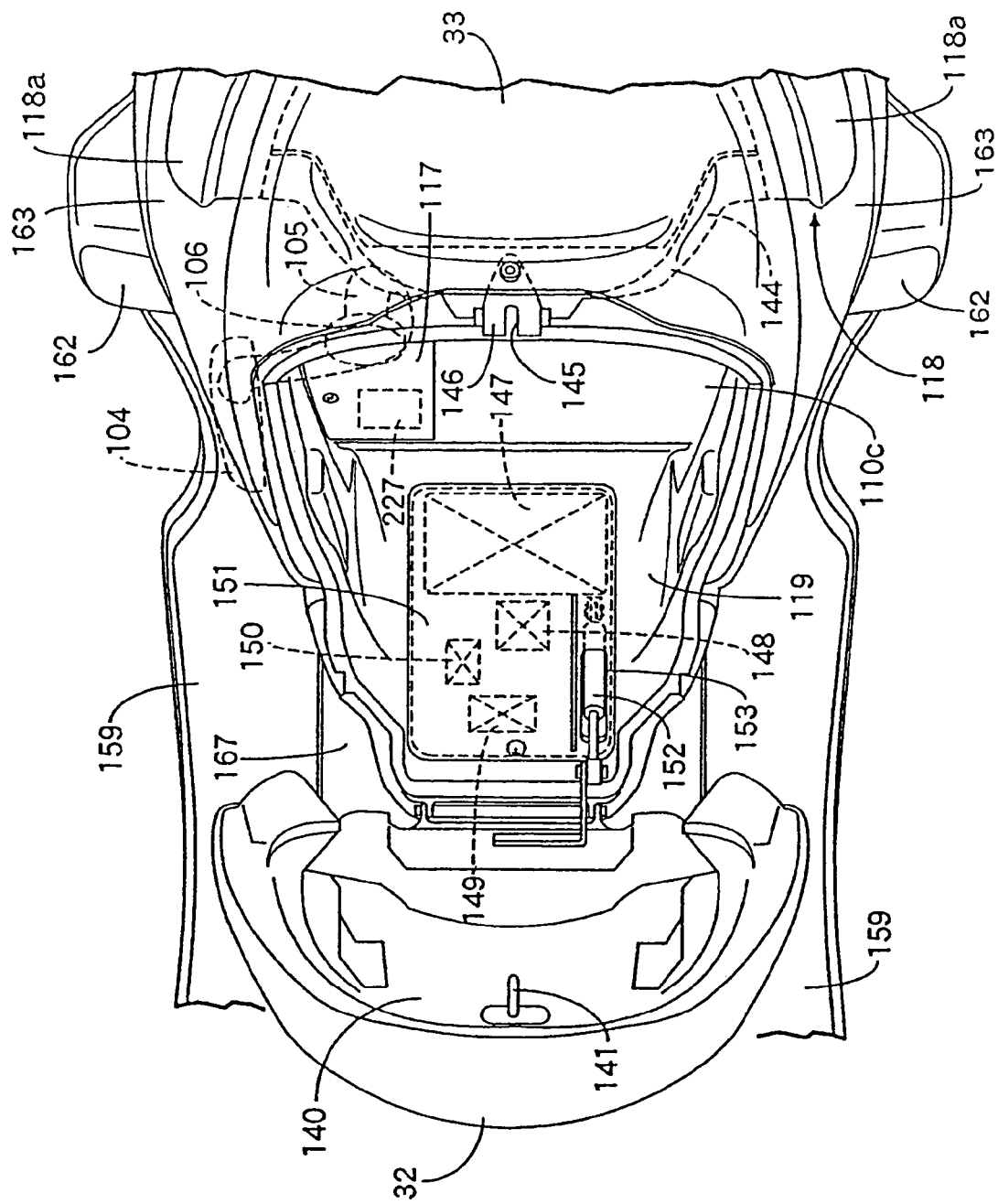
FIG. 12 is a view as viewed in the direction of an arrow mark 12 of FIG. 11.
Figure 13:
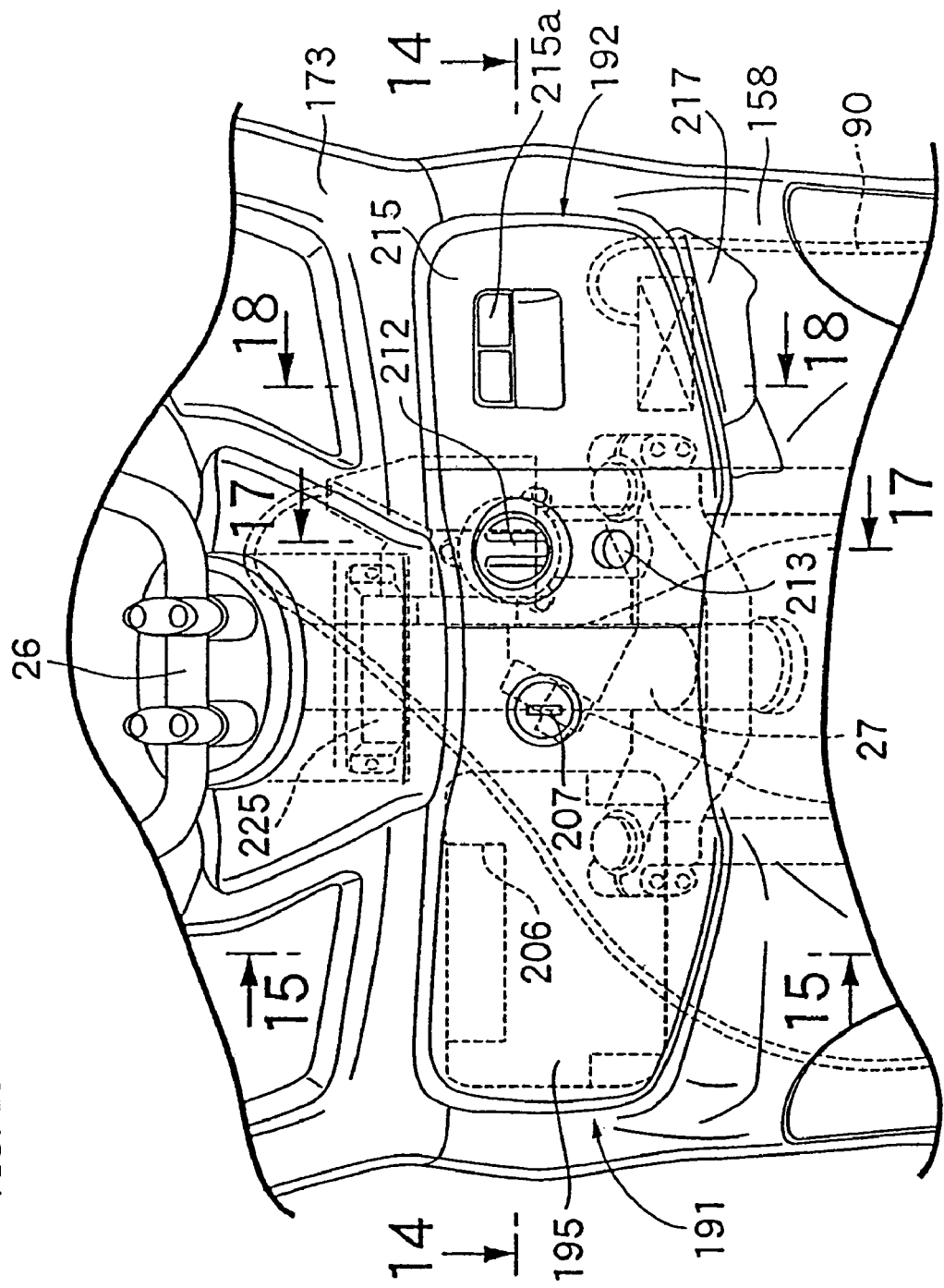
FIG. 13 is a view of the leg shield as viewed from the rear of the vehicle in the direction of an arrow mark 13 of FIG. 1, showing the first and second article accommodating portions formed therein.
Figure 14:
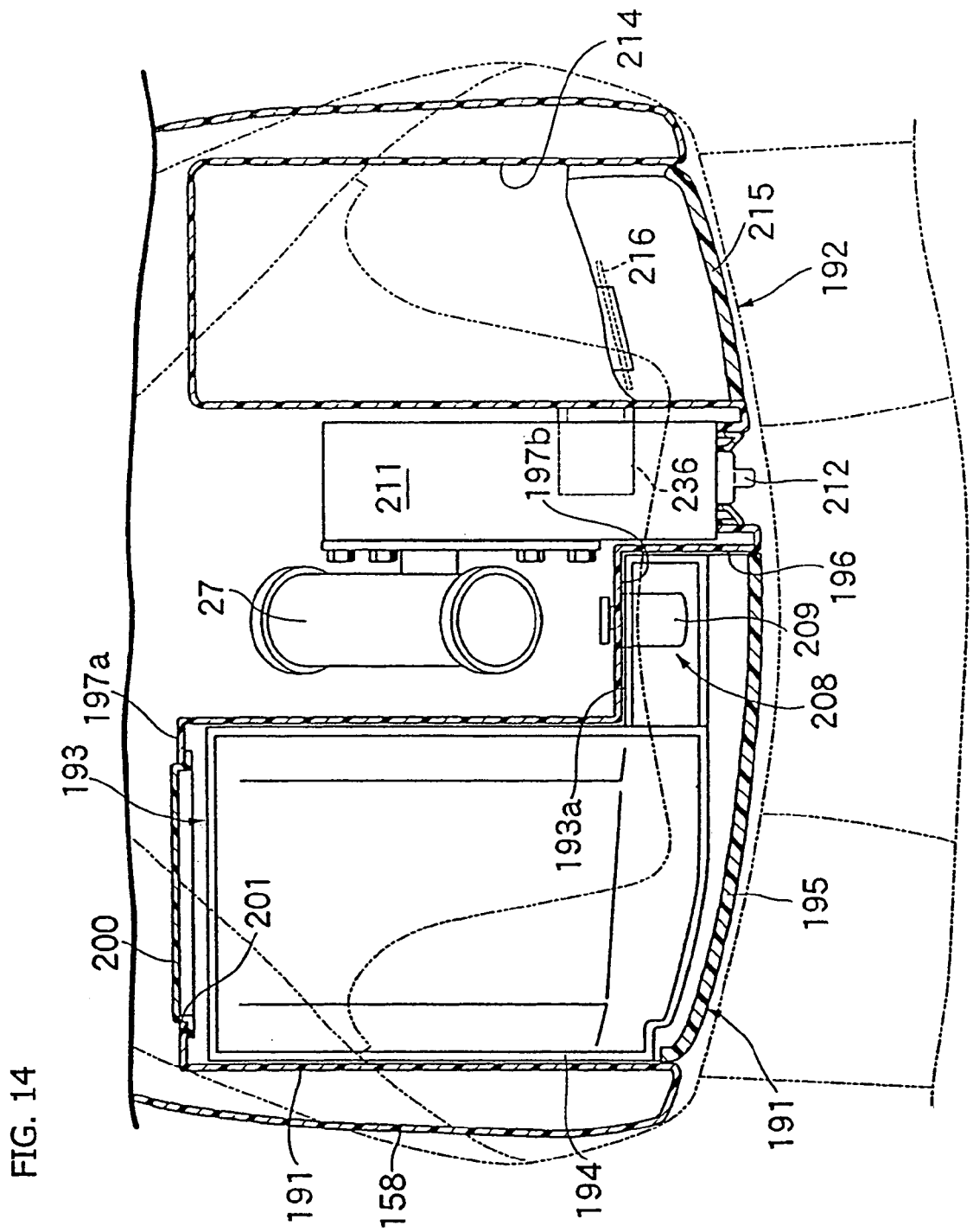
FIG. 14 is a schematic top sectional view taken along line 14-14 of FIG. 13.
Figure 15:
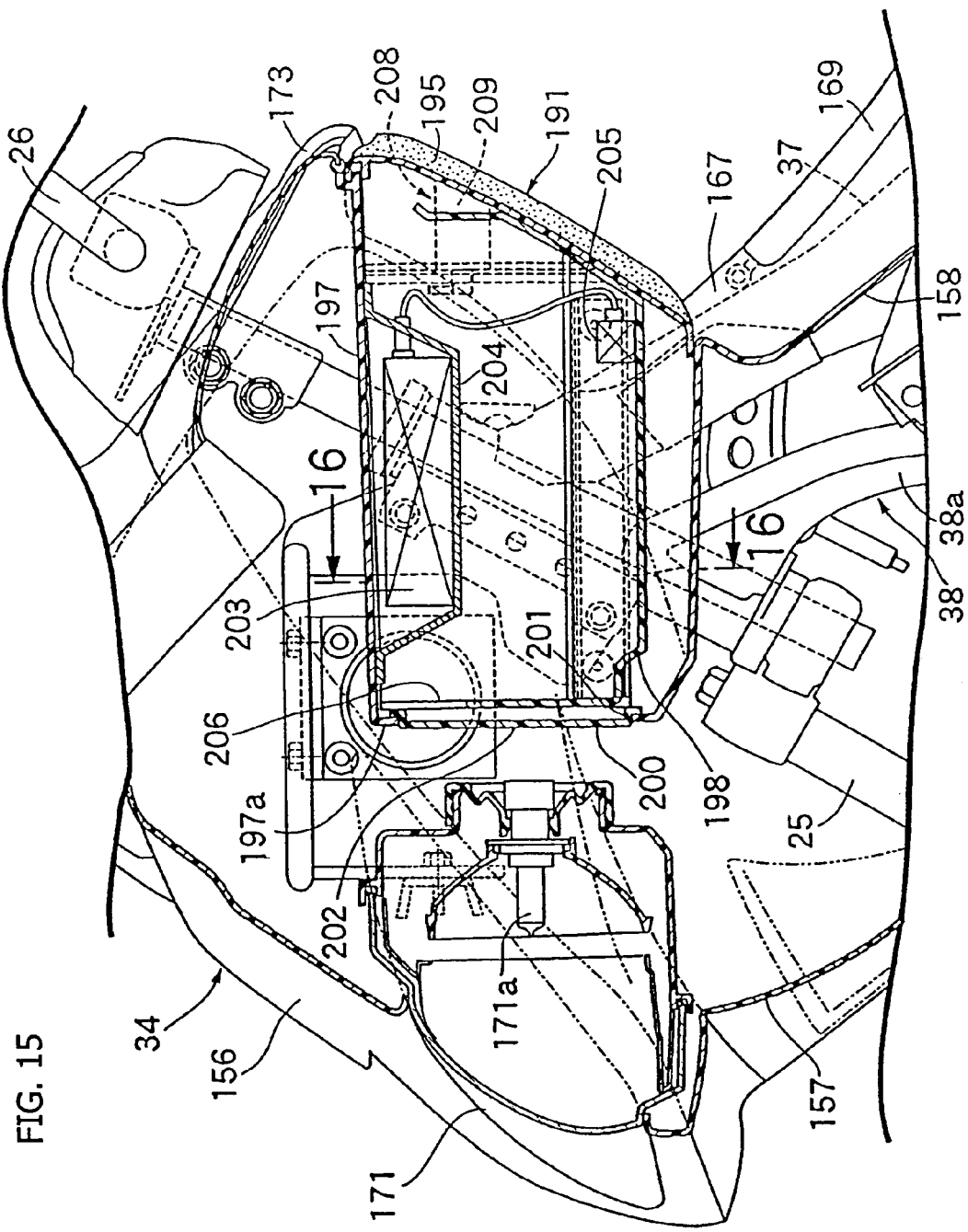
FIG. 15 is a side sectional view taken along line 15-15 of FIG. 13.
Figure 16:
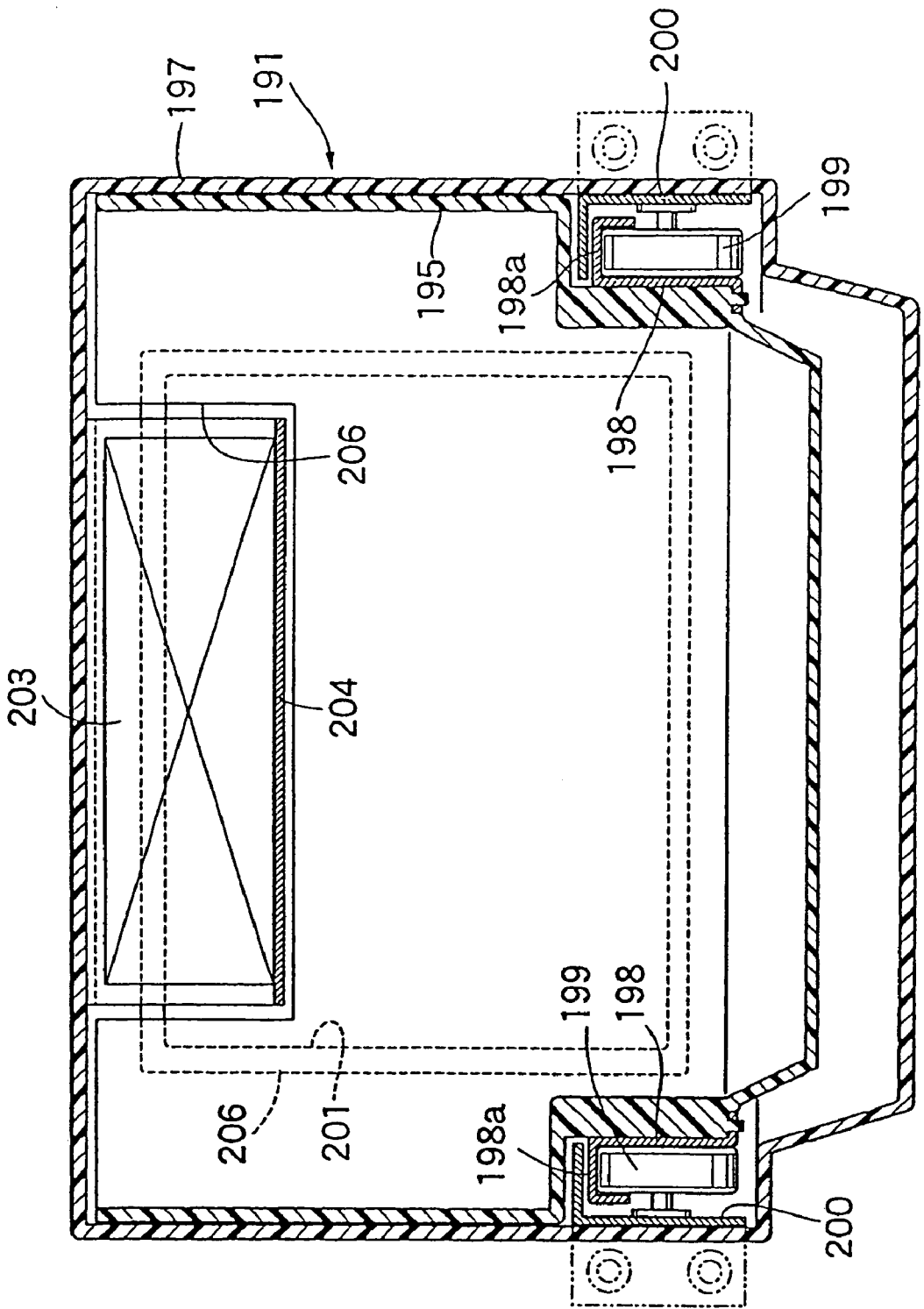
FIG. 16 is a sectional view taken along line 16-16 of FIG. 15.

Referring also to FIGS. 11 and 12, the fuel tank 28 is disposed forwardly of the storage box 30. A front enlarged portion 122 is provided at a lower portion of the front end of the storage box 30 such that it is enlarged forwardly to a location in the proximity of the bottom portion of the fuel tank 28 and is disposed between the fuel tank 28 and the radiator 29. A battery 147, which is electric equipment, is housed within the front enlarged portion 122. In other words, the battery 147 is disposed between the fuel tank 28 and the radiator 29.

In addition to the battery 147, other electric equipment 148, 149, 150 and so forth are accommodated in the front enlarged portion 122.

A second maintenance lid 151 is attached to the bottom wall of box body 100 of storage box 30 so as to allow opening and closing movement of the second maintenance lid 151. The second maintenance lid 151 partitions the front enlarged portion 122 and the front helmet accommodation portion 119 from each other. Maintenance of the battery 147 and the electric equipment 148 to 150 in the front enlarged portion 122 is performed by opening the second maintenance lid 151 while the front seat 32 is open.

A damper rod 152 is provided between a front portion of the front seat 32 and a front portion of the storage box 30 and assists opening and closing movements of the front seat 32 such that the front seat 32 is opened with low force and such that when the front seat 32 is to be closed, the closing speed is moderated. A lower portion of the damper rod 152 is accommodated in the front enlarged portion 122. A slide 153 is formed in the second maintenance lid 151 and allows the damper rod 152 to pass therethrough such that it permits displacement of the damper rod 152 in response to opening or closing movement of the front seat 32.

Referring back to FIG. 1, the vehicle body cover 34 includes a front cover 156 for covering a front portion of the head pipe 27 and an upper portion of the front wheel WF, a pair of left and right front side covers 157 joined to the opposite left and right sides of the front cover 156, and a leg shield 158 joined to the front side covers 157 such that it covers the front of the legs of the rider seated on the front seat 32 and covers the head pipe 27 from the rear side. The vehicle body cover 34 further includes a pair of left and right floor center covers 160 connecting to and extending rearward from the leg shield 158 and forming step floors 159 at lower end portions thereof. A pair of left and right floor side covers 161 extend downward from the outer edges of the step floors 159, respectively, and a pair of left and right passenger steps 162 are provided at rear portions of the step floors 159, respectively.

The vehicle body cover 34 further includes a pair of left and right body side covers 163 disposed at locations below the opposite sides of the riding seat 31 and connecting to and extending rearward from the floor side covers 161. A rear lower cover 164 connects to lower portions of the rear sides of the body side covers 163. The vehicle body cover 34 further includes a rear upper cover 165 disposed between the rear enlarged portion 121 of the storage box 30 and a rear portion of the grab rail 118. A rear center cover 166 is disposed between the pair of left and right tail lamp units 123 and connects to the rear upper cover 165 in such a manner as to cover from the rear the reduced width portion 121a of the rear enlarged portion 121 of the storage box 30.

A floor tunnel portion 167 is formed from part of the leg shield 158 and the pair of left and right floor center covers 160 and is enlarged upwardly between the step floors 159. The floor tunnel portion 167 is formed such that it is disposed to extend rearward of the head pipe 27 to another location below the front end of the riding seat 31 and is positioned above the fuel tank 28 and the radiator 29. A fill lid 169 is attached for opening and closing movement on the floor tunnel portion 167 in order to allow a fill cap 168 provided at the upper end of the fuel tank 28 to be opened. This allows the fuel tank 28 to be supplied. A hinged cover 170 (FIG. 5) is joined to a rear end of the floor tunnel portion 167 and covers the hinged portion of the front seat 32 to the storage box 30.

Headlamps 171 are individually disposed between the opposite sides of a front portion of the front cover 156 and front portions of the pair of left and right front side covers 157. Turn indicator lights 172 are disposed at front portions of the front side covers 157 below the headlamps 171. Further, a panel 173 on which meters are to be disposed is joined to upper portions of the front cover 156, front side covers 157 and leg shield 158. A meter visor 173a is provided integrally at a front portion of the panel 173 in such a manner as to be enlarged upwardly. Further, a windshield 174 is disposed forwardly of the meter visor 173a.

A front fender 175 for covering the front wheel WF from above is supported on the front fork 25. A pair of rear view mirrors 176, an audio operating switch case 177, a switch case 178 for operating various lamps, and so forth are attached to the steering handlebar bar 26.

A plug maintenance lid 180 is attached for opening and closing movement at a position on the left side floor center cover of the pair of left and right floor center covers 160 forward of the passenger step 162. The plug maintenance lid 180 allows access to and maintenance of an ignition plug 179 provided in the engine E.

A license plate 182, a reflector 183 and a license lamp 184 are attached to a rear fender 181 which covers the rear wheel WR from the rear. The rear fender 181, together with the left and right tail lamp units 123 and the rear upper cover 165 and the rear center cover 166, which are cover members which form part of the vehicle body cover 34, are attached to the rear enlarged portion 121 of the storage box 30.

A pair of ribs 110e, which function as a rear fender, are provided to project from a lower face of the box body 110 of the storage box 30 forward of the rear fender 181 such that they are disposed on the opposed left and right sides of the rear wheel WR as shown in FIG. 5.

Referring to FIGS. 13 to 16, first and second article accommodating portions 191, 192 are disposed separately leftwardly and rightwardly on the leg shield 158. The first article accommodating portion 191 is formed as an accommodation section of the drawer type including an accommodating case 193 which is drawn out and removed from the leg shield 158.

The accommodating case 193 includes a decorative cover 195 fixedly mounted at an outer end of a case body 194 made of, for example, a synthetic resin material and formed as a rectangular box open at the top thereof. A rectangular opening 196 is formed in the leg shield 158 and allows the accommodating case 193 to be inserted and removed therethrough. A housing wall 197 formed as a rectangular tube is provided integrally on and contiguously to the opening 196 and is closed at an inner end thereof with an end wall 197a.

A pair of movable rails 198, 198 are secured to lower portions of the opposite sides of the case body 194 and extend forwardly and rearwardly. Supporting portions 198a, 198a are formed integrally at upper ends of the movable rails 198 such that they have a downwardly open substantially U shape. A pair of fixed rails 200, 200 are secured to the opposite inner side faces of the housing wall 197 and extend forward and rearward in a corresponding relationship to the movable rails 198. A plurality of, for example, two, rollers 199, 199 are supported for rotation at different locations spaced from each other in a longitudinal direction of each of the fixed rails 200 such that they receive the supporting portions 198a of the movable rails 198 placed thereon.

Consequently, the accommodating case 193 is inserted into the housing wall 197 through the opening 196 such that it is slidably moved between a retracted position wherein the decorative cover 195 of the accommodating case 193 lies substantially in flush with the rear face of the leg shield 158, and a drawn out position wherein most part of the decorative cover 195 is drawn out from the housing wall 197. Also, it is possible to completely withdraw the entire accommodating case 193 from the leg shield 158. Additionally, the accommodating case 193 is formed such that, in the retracted position thereof, it extends from the left side to pass in front of the head pipe 27 when viewed from the rear of the vehicle.

In addition, a maintenance window 201 is provided in the end wall 197a of the housing wall 197 for allowing, when the accommodating case 193 is drawn out from the leg shield 158, such maintenance operations as replacing a bulb 171a of any of the headlamps 171 positioned forward of the end wall 197a to be performed. The maintenance window 201 is covered with a removable lid 202.

A support frame 204 for receiving an audio amplifier 203 placed thereon is attached to an upper face of the housing wall 197. A connector 205 connecting to the amplifier 203 is connected to a portable sound source such as an MP3, CD or MD player accommodated in the accommodating case 193. Additionally, in order to prevent interference of the support frame 204 with the accommodating case 193 when the accommodating case 193 is slidably moved between the retracted position and the drawn out position, a cutaway portion 206 corresponding to the support frame 204 is provided at the inner end of the case body 194 of the accommodating case 193.

It is to be noted that the amplifier 203 may otherwise be disposed fixedly in the accommodating case 193. In this instance, since the support frame 204 is rendered unnecessary, the necessity to provide the cutaway portion 206 at the inner end of the case body 194 is eliminated.

An enlarged portion 193a is provided at the outer end side of the accommodating case 193 such that it confronts a portion of the decorative cover 195. The enlarged portion 193a extends inwardly in the widthwise direction of the vehicle body. A recessed portion 197b of housing wall 197 confronts and surrounds the head pipe 27 about the left side and the rear side so that it accommodates the enlarged portion 193a when the accommodating case 193 is retracted to the retracted position.

A locking mechanism 208 is provided between the accommodating case 193 and the leg shield 158. The locking mechanism 208 effects changeover between connection, and cancellation of the connection, of the accommodating case 193 to the leg shield 158 in response to a key operation from a keyhole 207 facing the front face of the accommodating case 193. The locking mechanism 208 is provided on the enlarged portion 193a of the accommodating case 193 such that a cylinder lock 209, which operates in response to a key operation from the keyhole 207, performs changeover between engaging connection and cancellation of the engagement of the recessed portion 197b of the housing wall 197. The locking mechanism 208 is disposed at a position opposing the head pipe 27 when viewed from the rear.

A handlebar lock module 211 capable of disabling a steering operation of the steering handlebar bar 26 is disposed near the head pipe 27 on the side opposite to the first article accommodating portion 191. The second article accommodating portion 192 is disposed such that the handlebar lock module 211 is sandwiched between the first article accommodating portion 191 and the second article accommodating portion 192.

Figure 17:
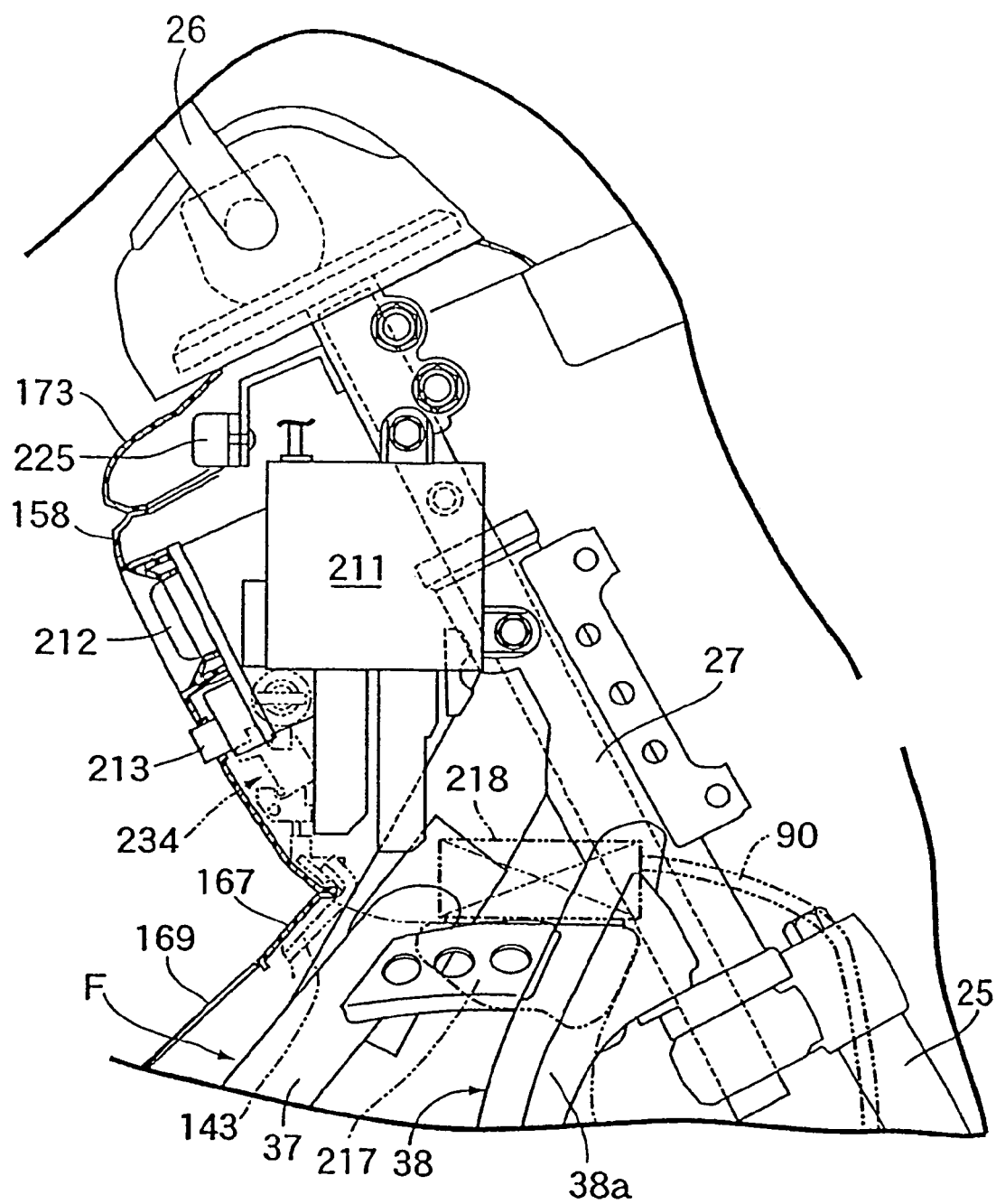
FIG. 17 is a side sectional view taken along line 17-17 of FIG. 13.

Referring to FIG. 17, the handlebar lock module 211 enables a steering operation of the steering handlebar bar 26 and enables starting of the engine E in response to an operation of a knob 212 under predetermined conditions. The knob 212 is exposed to a rear face of the leg shield 158 between the first and second article accommodating portions 191, 192. A seat unlocking switch 213 is disposed on the rear face of the leg shield 158 below the handlebar lock module 211 for enabling an opening operation of the front seat 32 of the riding seat 31 in response to an operation thereof under predetermined conditions.

Figure 18:
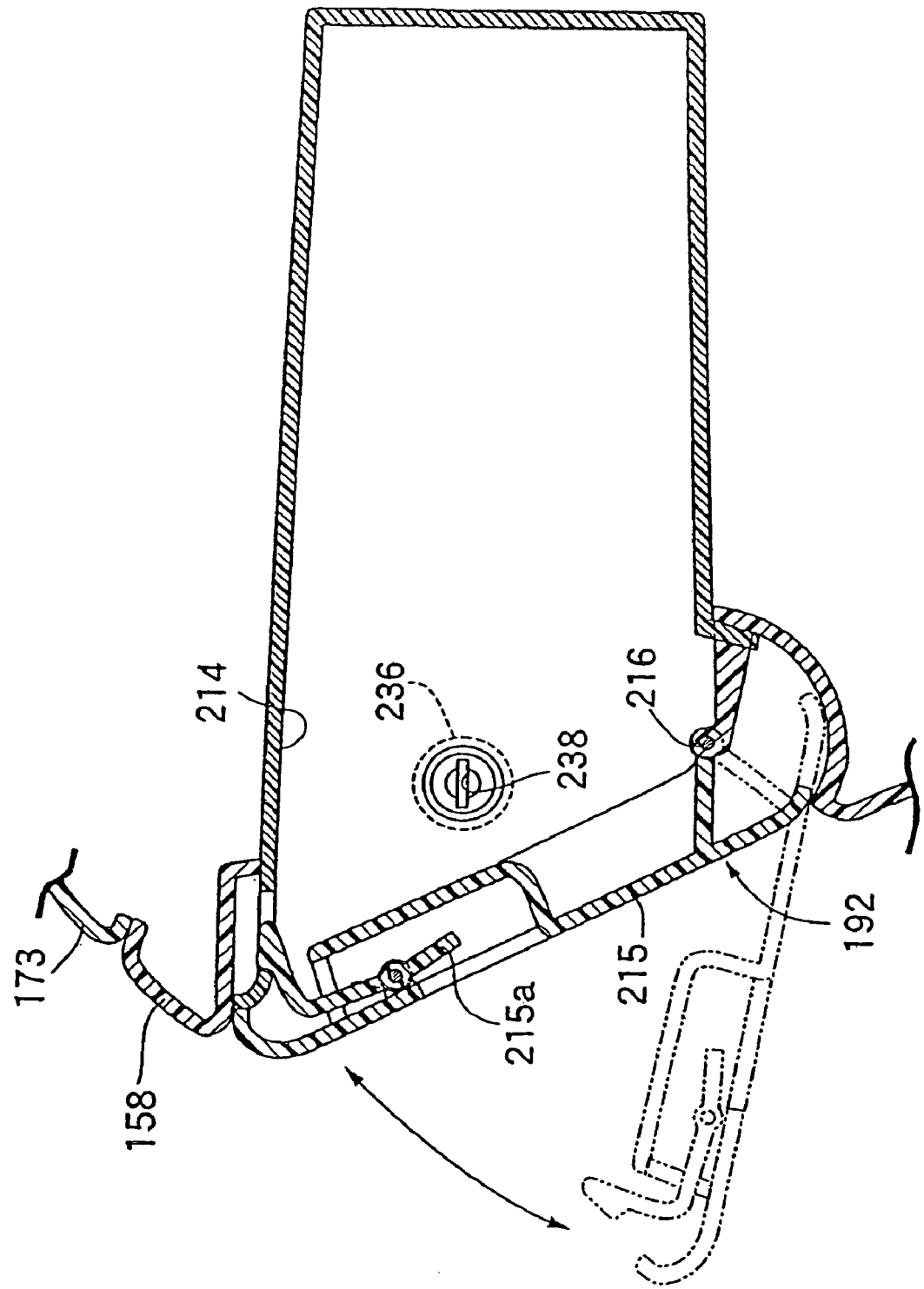
FIG. 18 is a side sectional view taken along line 18-18 of FIG. 13.

Referring to FIG. 18, the second article accommodating portion 192 is formed such that an accommodating recess 214 formed on the leg shield 158 is covered for opening and closing movement with a lid member 215 hinged to the leg shield 158. The accommodating recess 214 is formed such that it is smaller than the accommodating case 193 of the first article accommodating portion 191 and has a width that decreases slightly toward the front end thereof.

The lid member 215 is hinged to the leg shield 158 by a pivot shaft 216 for pivotal movement between a downwardly pivoted open position at which it opens the accommodating recess 214 as indicated in a chain line in FIG. 18 and a closing position at which it closes up the accommodating recess 214 as indicated by solid lines in FIG. 18. A latch 215a for allowing a pivotal operation is pivotably provided on the lid member 215.

A parking brake lever 217 for operating the brake cable 90 connecting to the drum brake 87 of the rear wheel WR is supported for pivotal operation on the leg shield 158 below the lid member 215. The brake cable 90 extends from a parking brake system 218 which operates in response to an operation of the parking brake lever 217.

Figure 19:
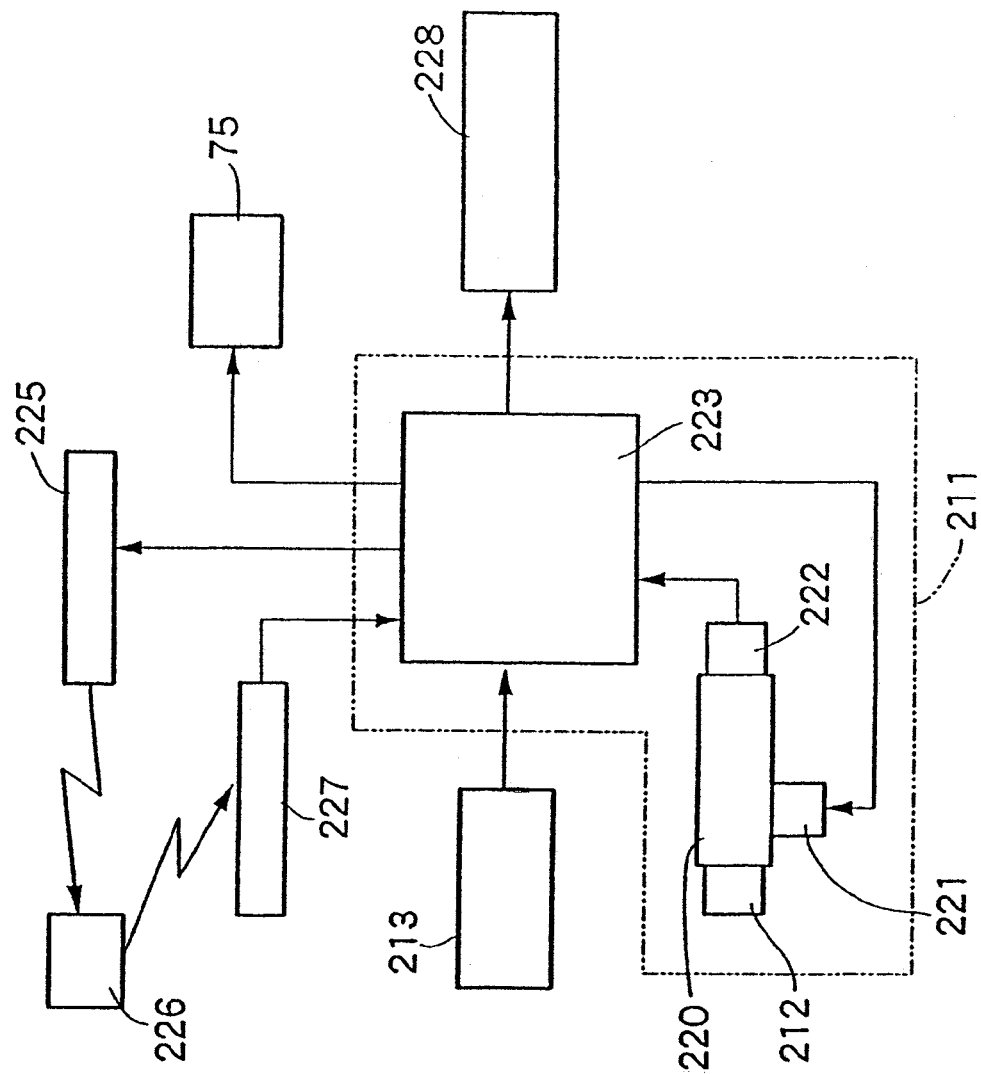
FIG. 19 is a schematic diagram showing a configuration of the remote control system of the present invention.

Referring to FIG. 19, the controller 75 housed in the control box 76 that is attached to the throttle body 68, the handlebar lock module 211, and the seat unlocking switch 213 form part of a remote control system. The handlebar lock module 211 includes a cylinder lock 220. Cylinder lock 220 is operable for pivotal motion by the knob 212 and cancels the locked state of the steering handlebar bar 26 to the head pipe 27 when it is operated to make a pivotal motion. The handlebar lock module also includes a lock solenoid 221 capable of disabling the pivotal motion of the cylinder lock 220. The handlebar lock module 211 further includes a main switch 222 which performs a switching action in response to the pivotal motion of the cylinder lock 220, and a control unit 223 to which a signal from the main switch 222 is inputted. The lock solenoid 221 is controlled by the control unit 223.

The control unit 223 controls a transmission antenna 225 to transmit a signal for urging a conventional portable transmitter 226 carried by the vehicle user to transmit an ID signal. A result of reception of a signal by a receiver 227 which receives a signal from the portable transmitter 226 is input to the control unit 223. When the control unit 223 confirms that an ID signal transmitted from the portable transmitter 226 is a predetermined signal, it renders the lock solenoid 221 operative to permit a pivoting operation of the cylinder lock 220 by the knob 212.

Further, when the control unit 223 confirms that an ID signal transmitted from the portable transmitter 226 is a predetermined signal, it operates a seat lock actuator 228 in response to an operation of the seat unlocking switch 213 and enables operation control of the engine E by the controller 75 in response to closing of the main switch 222.

The receiver 227 is disposed in the storage box 30 or in the riding seat 31. In the present working example, a receiver accommodating portion 110f is provided on the storage box 30 within a downward depression in the shallow bottom portion 10c of the storage box 30. The receiver 227 is accommodated in the receiver accommodating portion 110f. Additionally, the first maintenance lid 117 for allowing maintenance relating to the engine E disposed below the storage box 30 to be performed therethrough is provided for opening and closing movement on the shallow bottom portion 110c, and the receiver 227 is positioned in the receiver accommodating portion 110f such that it is covered with part of the first maintenance lid 117.

Figure 20:
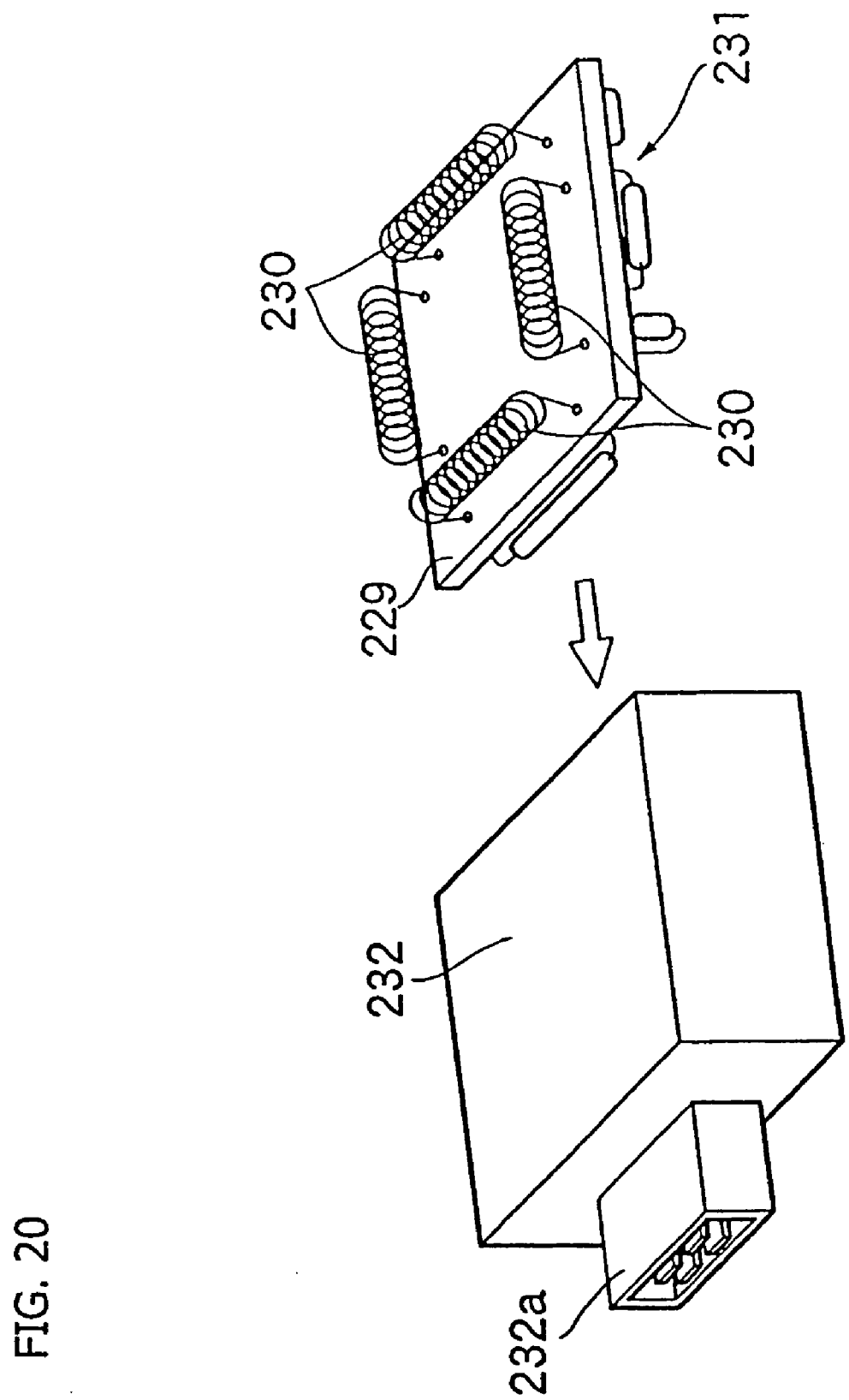
FIG. 20 is an exploded perspective view of a receiver showing the circuit board isolated from the housing.

Referring to FIG. 20, the receiver 227 includes a board 229 having antennae 230, 230, disposed on one face thereof and having a reception circuit 231 provided on the other face thereof. The receiver 227 is accommodated in a case 232 which includes a coupler element 232a integrally provided thereon.

The transmission antenna 225 is disposed at a position spaced away from the handlebar lock module 211. In the present working example, the transmission antenna 225 is disposed above the handlebar lock module 211 on the center line in the widthwise direction of the vehicle body, for example, immediately below the panel 173 which forms part of the vehicle body cover 34 (FIG. 17).

Figure 21:
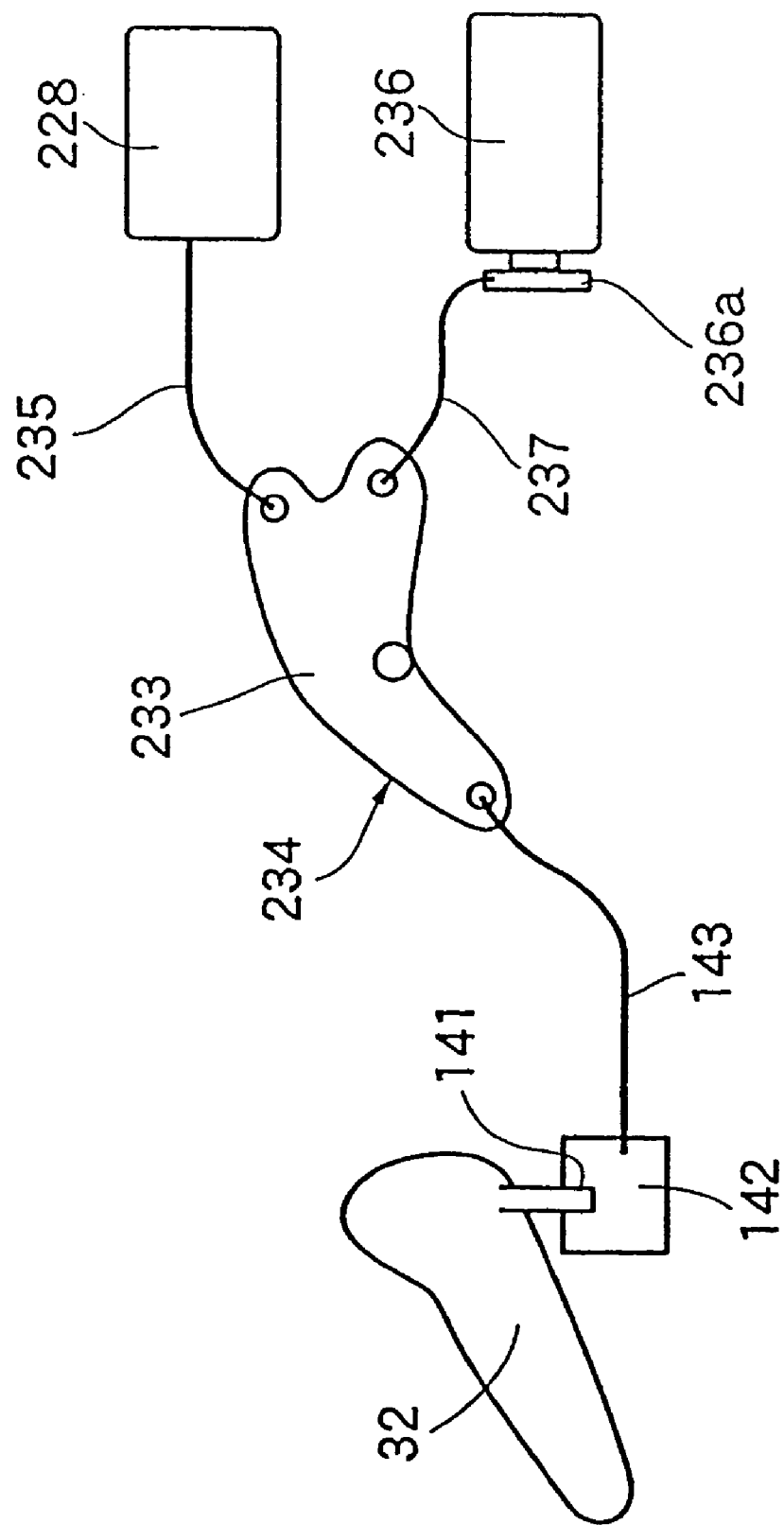
FIG. 21 is a view showing a general configuration of the linking mechanism of an emergency unlocking system for a seat lock of the present invention.

Referring to FIG. 21, the motion transmitting cable 143 connecting to the seat latch 142 is connected to one end of a link 233 provided in a link mechanism 234. The seat lock actuator 228 is connected to the other end of the link 233 through a cable 235 so as to pivot the link 233 to pull the motion transmitting cable 143 upon operation of the seat lock actuator 228.

A keyhole 238 of an emergency unlocking key cylinder lock 236 is disposed on an inner side face of the accommodating recess 214 of the second article accommodating portion 192 adjacent the handlebar lock module 211. The emergency unlocking key cylinder lock 236 is disposed in the leg shield 158 so as to enable at least starting of the engine E and handlebar lock cancellation without the necessity for the portable transmitter 226.

The emergency unlocking key cylinder lock 236 includes a pivotal lever 236a which is pivoted by an operation of the emergency unlocking mechanical key inserted in the keyhole 238. The pivotal lever 236a is connected to the other end side of the link 233 through a cable 237.

If the emergency unlocking key cylinder lock 236 is operated for unlocking, then the link 233 pivots to pull the motion transmitting cable 143. Thus, by any of the operation of the seat lock actuator 228 and the unlocking operation of the emergency unlocking key cylinder lock 236, the link 233 is pivoted to pull the motion transmitting cable 143. In response to the pivotal motion of the link 233, the seat latch 142 is changed over from the seat catching state to the seat catch releasing state.

When the seat latch 142 is in the seat catch releasing state, the front seat 32 is released to allow opening thereof, and if a predetermined part disposed in the storage box 30 is operated, then the control unit 223 enters a control mode similar to that upon reception of an ID signal from the normal portable transmitter 226 and allows the scooter type vehicle to be steered.

Operation of the present working example is described below. The rear enlarged portion 121 is enlarged at a location behind the support pipe 62, which serves as the attaching portion of the upper portion of the rear shock absorber 64 to the rear end of the rear seat 33 and the rear portion of the vehicle body frame F. The rear enlarged portion 121 is provided at the rear portion of the storage box 30. The storage box 30 has the front helmet accommodation portion 119 disposed below the front seat 32 provided on the riding seat 31 of the tandem type and the rear helmet accommodation portion 120 disposed below the rear seat 33 provided on the riding seat 31. Therefore, the volume of the storage box 30 is increased so as to allow an elongated article such as a golf club, which extends rearwardly farther than the rear end of the riding seat 31, to be accommodated in the storage box 30. Additionally, also it becomes possible to accommodate a small article other than a helmet in a rear portion of the storage box 30, and an article which is used less frequently such as a tool is accommodated suitably in the rear portion of the storage box 30.

Further, since the rear enlarged portion 121 is enlarged toward the rear to a position substantially the same as that of the rear end of the grab rail 118 disposed around the rear seat 33, the capacity of the storage box 30 is further increased and the rear portion of the storage box 30 is protected by the grab rail 118.

Further, since the reduced width portion 121a, which extends to the location between the left and right tail lamp units 123, 123 as viewed from above, is provided at the rear portion of the rear enlarged portion 121, the space produced between the pair of left and right tail lamp units 123, 123 is efficiently utilized to increase the capacity of the storage box 30. It also becomes easy to provide a space for exchanging a bulb of any of the tail lamp units 123.

The storage box 30 has the upper face cover 111 disposed below the rear seat 33, and since the accommodating space 128, which is used upon removal of the rear seat 33, is formed on the upper face of the upper face cover 111, a space for accommodating a small article at a location other than the inside of the storage box 30 is provided while preventing an increase in the number of required parts and complication of the structure. In addition, the accommodation space 128 is formed between the first rib 127 and the second rib 128.

First rib 127 projects upward from the upper face cover 111 and is formed in a ring shape. The second rib 129 projects downward from the bottom plate 33a of the rear seat 33 and is also formed in a ring shape. The second rib 129 cooperates with the first rib 127 to form a labyrinth structure, and this simple structure prevents admission of rainwater, dust or the like into the accommodation space 128 from around the accommodation space 128.

Additionally, the light source 116 for illuminating the inside of the storage box 30 is attached to the inner side face of the storage box 30 at a location corresponding to the front portion of the upper face cover 111. The inside of the rear portion of the storage box 30, which is likely to become dark due to the provision of the upper face cover 111, is illuminated effectively without having to place an illuminating article within the rear portion of the storage box 30. Additionally, at the location corresponding to the front portion of the upper face cover 111, the inner side face of the storage box 30 is likely to be viewed, and thus dunning down of a bulb of the light source 116 or the like is readily confirmed.

Further, since the rear upper cover 165 and the rear center cover 166 which cover the rear enlarged portion 121, the pair of left and right tail lamp units 123, and the rear fender 181 are attached to the rear enlarged portion 121, a plurality of parts disposed around the rear portion of the storage box 30 are removed at one time by only removing wiring lines for the tail lamp units 123. Consequently, superior facility in maintenance is assured.

The storage box 30 includes the shallow bottom portion 110c disposed between the front helmet accommodation portion 119 and the rear helmet accommodation portion 120. The throttle body 68, for which the control box 76 which houses the controller 75 therein is provided, and the fuel injection valve 74 are disposed below the shallow bottom portion 110c such that the positions of the top ends thereof are all substantially at the same height. Accordingly, by forming the shallow bottom portion 110c flat between the front and rear helmet accommodation portions 119 and 120, the shallow bottom portion 110c is utilized effectively as a container. Additionally, part of the intake system of the engine E is disposed effectively in the space below the shallow bottom portion 110c.

The lower portion of the rear enlarged portion 121 is disposed below the upper attaching portion of the rear shock absorber 64 to the rear portion of the vehicle body frame F such that the container portion 124 is formed within the rear enlarged portion 121. In container portion 124, the enlarged portion 110d, formed by partly enlarging the bottom wall of the storage box 30 upward, is interposed between the rear helmet accommodation portion 120 and the container portion 124. The rear helmet accommodation portion 120 and the container portion 124 behind of the rear helmet accommodation portion 120 are partitioned by the enlarged portion 110d so that improved convenience in use is achieved, and so that an article placed in the container portion 124 toward the rear is prevented from moving forward or rearward by means of the enlarged portion 110d.

Further, the fuel tank 28, formed to be elongate and oriented in the vertical direction as viewed from the side, is disposed in front of the storage box 30. The front enlarged portion 122 is provided at the lower portion of the front end of the storage box 30 such that it is enlarged toward the front at a location near the bottom portion of the fuel tank 28. Thus, the front portion of the storage box 30 is formed deep to facilitate accommodation of an elongated article therein, and the capacity of the storage box 30 is increased.

Additionally, since the battery 147 and other electric equipment 148 to 150 are accommodated in the front enlarged portion 122, they are accommodated in the storage box 30 so as not to obstruct accommodation of the helmet H1 or the like.

Further, since the second maintenance lid 151, which partitions the inside of the front enlarged portion 122 and the front helmet accommodation portion 119 from each other, is attached for opening and closing movement to the storage box 30, an article accommodated in the front enlarged portion 122 and the helmet H1 accommodated in the front helmet accommodation portion 119 are prevented from contacting with and damaging each other.

Further, since the lower portion of the damper rod 152, which extends generally vertically in such a manner as to assist the opening or closing movement of the front seat 32, is accommodated in the front enlarged portion 122, there is no need to provide a space to position the damper rod 152 outside of the storage box 30. Additionally, when the front seat 32 is open, the damper rod 152 is minimally exposed to the outside so that it does not provide an obstruction when an article is to be placed into the storage box 30, and the appearance and the form is improved.

The fuel tank 28 and the radiator 29 are disposed below the floor tunnel portion 167, which is formed from part of the vehicle body cover 34 which covers the vehicle body frame F. The vehicle body frame F includes the head pipe 27, the pair of left and right upper down frames 37 extending rearward and downward from the head pipe 27, and the pair of left and right lower down frames 38 having the inclined portions 38a extending rearward and downward from the head pipe 27 below the connecting portions of the upper down frames 37 to the head pipe 27. The fuel tank 28, extending generally vertically from a location behind the lower portion of the head pipe 27 to the lower portions of the lower down frames 38, is disposed in the space surrounded by the upper down frames 37 and the lower down frames 38 and positioned immediately rearwardly of the front wheel WF.

Accordingly, since the fuel tank 28, elongate in shape and extending generally vertically, is disposed immediately behind the front wheel WF, the location corresponding to the lower portion of the head pipe 27 is prevented from becoming an unused space, and arrangement of parts making effective use of the space below the floor tunnel portion 167 is possible. Additionally, since the fuel tank 28, which has a comparatively high weight, is positioned nearer to the front wheel WF, the distribution load to the front wheel WF is raised resulting in an improvement in the turning performance. Further, the level of the remaining amount of fuel within the fuel tank 28 appears to be relatively high even when the remaining amount of the fuel is small because of the vertical orientation of the fuel tank 28. Thus, the high level is advantageous for suction by the pump unit 97 due to the advantageous placement of the pump unit 97 at the lower end of the fuel tank 28 as in the present working example.

Further, since the radiator 29 is disposed behind the fuel tank 28 and the battery 147 is disposed between the radiator 29 and the fuel tank 28, the space behind the fuel tank 28 is made relatively large by forming the fuel tank 28 in a vertically elongated configuration. Further, the battery 147, which is a heavy article, is disposed at the center in the forward and backward direction of the vehicle body, and this contributes to improved steering performance. Furthermore, since the battery 147 is disposed between the radiator 29 and the fuel tank 28, the fuel tank 28 is shielded from the influence of heat from the radiator 29.

Since the pump unit 97, housed within and positioned at the lower portion of the inside of the fuel tank 28, is attached to the fuel tank 28 from the rear face side of the fuel tank 28, the pump unit 97 is attached to the fuel tank 28 so that it is not influenced by an irregular road surface.

Additionally since the pump unit 97 is attached to the fuel tank 28 in a posture wherein the axis of rotation thereof is inclined forward and downward, the intake port of the pump unit 97 is positioned as close as possible to the bottom portion of the fuel tank 28 to minimize the amount of unused fuel in the fuel tank 28.

The reservoir tank 104 of the radiator 29 is disposed below the step floor 159. Step floor 159 forms part of the vehicle body cover 34. The water supply port of the reservoir tank 104 is disposed below the first maintenance lid 117, which is removably attached to the bottom wall of the storage box 30 disposed below the riding seat 31. Accordingly, since the radiator 29 is disposed behind the fuel tank 28, it is easy to make the water supply port 107 of the reservoir tank 104 face the bottom portion of the riding seat 31, and the water supply port 107 is disposed higher than that where the water supply port faces the step floor 159 or the like, which is positioned immediately above the reservoir tank 104. Thus the operability in supplying water is improved.

Additionally, since the water supply port forming member 108, which forms the water supply port 107, is supported on the attaching portion 54 to the vehicle body frame F side of the tension rod 53 provided between the vehicle body frame F and the unit swing engine UE, the water supply port forming member 108 is supported by the vehicle body frame F, and thus it is unnecessary to take special measures to support the water supply port forming member 108.

Further, the fuel from the fuel tank 28 is supplied to the fuel injection valve 74, and the fuel in the fuel tank 28 is supplied effectively to the fuel injection valve 74 using the pump unit 97 which is urged by the fuel tank 28 wherein the remaining amount of the fuel appears to be at a comparatively high level when the amount of remaining fuel is small.

The swing arm 48, disposed on the right side of the rear wheel WR and supporting the rear wheel WR thereon, is formed in a substantially triangular shape as viewed from the side. The brake caliper 85 of the rear brake 84 is supported on the swing arm 48 within the opening 81 provided at a substantially central portion of the swing arm 48. Thus, the brake caliper 85 is disposed at a relatively low position thereby to lower the center of gravity of the scooter type vehicle. Further, since the brake caliper 85 is surrounded by the swing arm 48 therearound, it is possible to assure a substantial dimension in the generally vertical direction of the swing arm 48 as viewed from the side, raising the rigidity in the vertical direction and the torsional rigidity of the swing arm 48.

Further, since the exhaust muffler 78 is disposed laterally outward and to the side of the swing arm 48 in such a manner as to cover the brake caliper 85 from the outside, the appearance is improved.

Additionally, since the opening 81 is formed such that the vertical dimension thereof decreases toward the rear, and the brake caliper 85 disposed in the rear portion of the opening 81 is supported on the swing arm 48 at a location behind the opening 81, the brake caliper 85 is supported at a portion of the swing arm 48 having a high rigidity. Thus the rigidity in attachment of the brake caliper 85 is also high.

The lower portion of the exhaust muffler 78 is fastened to the swing arm 48 at two places so as to sandwich the axle 80 of the rear wheel WR on opposing front and rear sides of the axle 80. A straight line L is defined that interconnects these two fastening places. Since the fastening portions of both the rear shock absorber 64 and the rear axle 80 to the swing arm 48 are disposed between the straight line L and the exhaust muffler 78, assembly of the exhaust muffler 78 and the rear shock absorber 64 to the swing arm 48 is facilitated. Further, the axle 80 and the fastening portions are not easily viewed from a position to the side and above the scooter type vehicle thereby improving the appearance.

The electric motor 42 for varying the transmission gear ratio of the continuously variable transmission M interposed between the engine E and the rear wheel WR, is disposed below the passenger step 162 provided at the rear portion of the step floor 159 provided on the vehicle body cover 34. Since the electric motor 42 is disposed at a relatively low position, this contributes to lowering the center of gravity of the scooter type vehicle.

Since the continuously variable transmission M is of the belt type and forms the unit swing engine UE together with the engine E, wherein the axis of the cylinder 45 extends substantially horizontally and the electric motor 42 is disposed to the side of the cylinder 45 forward of the continuously variable transmission M, the electric motor 42 is protected by the cylinder 45 of the engine E and the continuously variable transmission M. Additionally, since the support frame 41 which supports the step floor 159 from below is provided on the vehicle body frame F, and the electric motor 42 is disposed below the support frame 41, the electric motor 42 is protected further effectively by the rigid support frame 41.

Furthermore, since the electric motor 42 is disposed such that the axis of rotation thereof is directed in the widthwise direction of the vehicle body, the electric motor 42 is disposed to the side of the cylinder 45 provided on the engine E such that it does not project laterally outward and to the side from the outer side face of the continuously variable transmission M.

The grab rail 118 is attached to the rear portion of the vehicle body frame F. The back rest 135, which has, on the upper face thereof, the front inclined face 135a inclined forward and downward and the rear inclined face 135b inclined rearward and downward as viewed from the side such that it has a substantially streamlined shape. The back rest 135 is attached to the upper face of the rear portion of the grab rail 118 and is disposed behind the rear seat 33 provided on the riding seat 31.

Accordingly, the waist portion of the passenger on the rear seat 33 is supported firmly by the forward and downwardly inclined front inclined face 135a from within the upper face of the back rest 135. Additionally, since the back rest 135 has a substantially streamlined shape, the appearance and the aerodynamic performance of the back rest 135 is improved. Further, since the rearward and downwardly inclined rear inclined face 135b from within the upper face of the back rest 135 is utilized, a load which projects toward the rear from the rear seat 33 is placed on the back rest 135.

Further, since the back rest 135 is formed such that the width thereof gradually decreases toward the rear as viewed from above, the back rest 135 is compactly formed, the design coordination is assured together with the shape of the vehicle body cover 34, and the aerodynamic performance is further improved.

Furthermore, since the upper face of the rear portion of the grab rail 118 is set to a height substantially equal to that of the upper face of the rear seat 33, and the back rest 135 is removably attached to the upper face of the rear portion of the grab rail 118, when the user wants to place a greater amount of luggage on the rear seat 33, the upper face of the rear portion of the grab rail 118 behind the back rest 135 is removed and is utilized effectively to receive the luggage.

A first article accommodating portion 191 and a second article accommodating portion 192 are provided in the leg shield 158 of the vehicle body cover 34. The first article accommodating portion 191 is formed as an article accommodation section of the drawer type including the accommodating case 193 which is drawn out and removed from the leg shield 158. The second article accommodation portion 192 includes the accommodating recess 214 formed on the leg shield 158 which is covered for opening and closing movement by the lid member 215 hinged to the leg shield 158. The first article accommodating portion 191 and a second article accommodating portion 192 are disposed separately on the respective left and right sides of the vehicle. Thus, the comparatively great space of the leg shield 158 is utilized effectively to accommodate an article in the leg shield 158. Additionally, since the accommodating case 193 is formed to be larger than the accommodating recess 214, a relatively large amount of articles are accommodated in the first article accommodating portion 191 as compared to the second article accommodating portion 192. Since the first article accommodating portion 191 is of the drawer type, when the lid is opened, the articles stored in the inside of the accommodating case 193 do not unintentionally fall out, and articles are fully accommodated within the accommodating case 193. Further, if the accommodating case 193 is completely removed from the leg shield 158, then the comparatively great opening 196 is formed in the leg shield 158, and consequently, maintenance is easily performed on the bulb 171a of the headlamp 171 disposed in front of the first article accommodating portion 191.

Further, the locking mechanism 208 is provided between the accommodating case 193 of the first article accommodating portion 191 and the leg shield 158. The locking mechanism 208 performs changeover between connection and cancellation of the connection of the accommodating case 193 to the leg shield 158 in response to a key operation from the keyhole 207 facing the front face of the accommodating case 193. When the key is inserted into the keyhole 207 of the locking mechanism 208 to operate the locking mechanism 208, a drawing out operation of the accommodating case 193 is enabled. Consequently, prevention of the theft of an article accommodated in the first article accommodating portion 191 is ensured. Further, since the key is used as a knob to draw out the accommodating case 193, the necessity for provision of a knob on the accommodating case 193 is eliminated, and a greater number of articles are accommodated into the first article accommodating portion 191.

The accommodating case 193 is formed such that, when it is in the retracted state, it covers the head pipe 27 from the left side to the right side. The locking mechanism 208 is disposed at a position at which it is opposed to the head pipe 27 when viewed from the rear. Thus, the locking mechanism 208 is disposed effectively in the space behind the head pipe 27 to further maximize the accommodation capacity of the accommodating case 193.

The handlebar lock module 211, which can disable a steering operation of the steering handlebar bar 26, is disposed in the proximity of the head pipe 27 on the opposite side to the first article accommodating portion 191. The second article accommodating portion 192 is disposed such that the handlebar lock module 211 is sandwiched between the first article accommodating portion 191 and the second article accommodating portion 192. Therefore, the first article accommodating portion 191, handlebar lock module 211 and second article accommodating portion 192 are disposed in a juxtaposed relationship in the leg shield 158 to further effectively utilize the comparatively great space of the leg shield 158.

Further, since the transmission antenna 225 is disposed at a position spaced away from the handlebar lock module 211, the degree of freedom in arrangement of the transmission antenna 225 is raised.

The receiver 227 can be disposed in the storage box 30 or the riding seat 31. In the present working example, it is disposed in the storage box 30. Thus the receiver 27 is protected from the adverse environmental effects of mud, dust, water, external force and so forth, and it is unnecessary to cover the receiver 227 with a cover member made of a synthetic resin material. Accordingly, the necessity for re-adjustment of the receiver 227 is eliminated, and the waterproof performance is assured.

Additionally, the receiver 227 is configured such that the board 229 has the antennae 230, 230 disposed on one face thereof and has the reception circuit 231 provided on the other face thereof, and the board is housed within the case 232. Thus, the receiver 227 is compactly formed, the required space for mounting the receiver 227 within the storage box 30 is minimized.

Furthermore, the first maintenance lid 117 allows maintenance to be performed relating to the engine E and is disposed below the storage box 30. First maintenance lid 117 provides opening and closing movement with respect to the bottom wall of the storage box 30. The receiver 227 is disposed in the storage box 30 in such a manner as to be covered with part of the first maintenance lid 117, thus the receiver 227 is disposed at a position suitable to receive maintenance thereon while preventing interference with an article accommodated in the storage box 30.

Further, the emergency unlocking key cylinder lock 236, which enables at least starting of the engine E and handlebar lock cancellation while eliminating the necessity for the portable transmitter 226, is disposed in the leg shield 158. Thus, even if the user of the vehicle loses the portable transmitter 226 or the power cell of the portable transmitter 226 has insufficient charge for operation, if the emergency unlocking key cylinder lock 236 is operated using the mechanical key for emergency unlocking, then the scooter type vehicle is operable.

The second article accommodating portion 192 is provided on the leg shield 158 on the right side of the handlebar lock module 211, and the keyhole 238 of the emergency unlocking key cylinder lock 236 faces the inner side face of the accommodating recess 214 of the second article accommodating portion 192. Since the accommodating recess 214 is normally covered by the lid member 215, the keyhole 238 is disposed at an inconspicuous place, and the keyhole 238 of the emergency unlocking key cylinder lock 236 is maximally prevented from being made an object of mischief.

Furthermore, the seat latch 142 performs the changeover between the seat catch state wherein the front seat 32 which can release the storage box 30 is held in the closed state and the seat catch releasing state wherein it allows opening and closing movement of the front seat 32. The link mechanism 234 is connected at a first end to the seat latch 142, and is connected at a second end to the seat lock actuator 228, which operates in response to an operation upon reception of a signal from the conventional portable transmitter 226. The link mechanism is also connected at the second end to the emergency unlocking key cylinder lock 236. Therefore, the link mechanism 234 for operating the seat latch 142 is commonly used for a case wherein the portable transmitter 226 is effective, and another case wherein the emergency unlocking key cylinder lock 236 is used. By using a single link mechanism, the number of parts is reduced.

While a working example of the present invention has been described above, the present invention is not limited to the working example described above, but various design alterations may be carried out without departing from the present invention as set forth in the claims.

We claim:

1. In a vehicle comprising a frame, an engine operatively attached to the frame and a steering handlebar, the improvement comprising a remote control apparatus comprising a transmission antenna, a portable transmitter, a receiver and a handlebar lock module, wherein the handlebar lock module comprises a locking mechanism and is operable to selectively engage the locking mechanism for locking and unlocking the steering handlebar, the handlebar lock module also comprises a knob operably connected to the locking mechanism for enabling at least a starting operation of the engine, the handlebar lock module being operatively attached to a portion of the vehicle frame, the portable transmitter provided for being carried by a vehicle user and operated at a location which is distant from the vehicle, wherein the receiver is operable to receive a signal from the portable transmitter and to provide input to the handlebar lock module;

the transmission antenna is operable to provide transmission of a signal that urges the portable transmitter to transmit an identity (ID) signal to the handlebar lock module, and the transmission antenna is mounted to the vehicle at a position spaced away from said handlebar lock module, wherein the handlebar lock module is operable to provide a handlebar lock cancellation operation in response to reception of the ID signal from the portable transmitter;

the receiver is separate from the handlebar lock module;

the receiver is disposed on the vehicle in a position spaced away from the transmission antenna; and the receiver is not directly physically connected to the transmission antenna.

2. The vehicle of claim 1, wherein the handlebar lock module comprises a main control unit and a lock solenoid operably connected to the locking mechanism so as to be capable of disabling the locking mechanism, wherein the lock solenoid is controlled by the main control unit such that when the handlebar lock module receives an ID signal from the portable transmitter, the main control unit determines whether the ID signal is a predetermined signal, and upon determination that the ID signal is a predetermined signal, the main control unit renders the lock solenoid operative to permit operation of the locking mechanism by manipulation of the knob.

3. The vehicle of claim 1, wherein the vehicle comprises a body cover which substantially surrounds the steering handlebar, wherein the handlebar lock module is mounted within the body cover adjacent to the steering handlebar, and wherein the transmission antenna is positioned within the body cover at a position above the handlebar lock module.

4. The vehicle of claim 3 wherein the transmission antenna is disposed proximate to the vehicle's width centerline.

5. In a vehicle comprising a frame, an engine operatively attached to the frame and a steering handlebar, the improvement comprising a remote control apparatus comprising a transmission antenna, a portable transmitter, a receiver and a handlebar lock module, wherein the handlebar lock module comprises a locking mechanism and is operable to selectively engage the locking mechanism for locking and unlocking the steering handlebar, the handlebar lock module also comprises a knob operably connected to the locking mechanism for enabling at least a starting operation of the engine, the handlebar lock module being operatively attached to a portion of the vehicle frame, the portable transmitter provided for being carried by a vehicle user and operated at a location which is distant from the vehicle, wherein the receiver is operable to receive a signal from the portable transmitter and to provide input to the handlebar lock module;

wherein the transmission antenna is operable to provide transmission of a signal that urges the portable transmitter to transmit an identity (ID) signal to the handlebar lock module, and the transmission antenna is mounted to the vehicle at a position spaced away from said handlebar lock module; and the receiver is separate from the handlebar lock module; the receiver is disposed on the vehicle in a position spaced away from the transmission antenna; and the receiver is not directly physically connected to the transmission antenna.

6. The vehicle of claim 5, wherein the handlebar lock module comprises a main control unit and a lock solenoid operably connected to the locking mechanism so as to be capable of disabling the locking mechanism, wherein the lock solenoid is controlled by the main control unit such that when the handlebar lock module receives an ID signal from the portable transmitter, the main control unit determines whether the ID signal is a predetermined signal, and upon determination that the ID signal is a predetermined signal, the main control unit renders the lock solenoid operative to permit operation of the locking mechanism by manipulation of the knob.

7. The vehicle of claim 5, wherein the vehicle comprises a body cover which substantially surrounds the steering handlebar, wherein the handlebar lock module is mounted within the body cover adjacent to the steering handlebar, and wherein the transmission antenna is positioned within the body cover at a position above the handlebar lock module.

8. The vehicle of claim 5, wherein the transmission antenna is disposed proximate to the vehicle's width centerline.

9. The vehicle of claim 2, wherein the remote control apparatus further comprises a seat unlocking switch and a seat lock actuator, each operatively connected to the main control unit.

10. The vehicle of claim 9, wherein when the main control unit confirms that an ID transmitted from the portable transmitter is a predetermined signal, the main control unit operates the seat lock actuator in response to an operation of the seat unlocking switch.

11. The vehicle of claim 6, wherein the remote control apparatus farther comprises a seat unlocking switch and a seat lock actuator, each operatively connected to the main control unit.

12. The vehicle of claim 11, wherein when the main control unit confirms that an ID transmitted from the portable transmitter is a predetermined signal, the main control unit operates the seat lock actuator in response to an operation of the seat unlocking switch.

13. A remote control system for a motorcycle having a steering handlebar and a frame, the remote control system comprising:

a handlebar lock module having a control unit, a locking mechanism, a knob operatively connected to the locking mechanism for enabling at least a starting operation of the engine, a transmission antenna mounted to the vehicle at a position spaced away from said handlebar lock module, the portable transmitter carried by a vehicle user and operated at a distant location from the vehicle; and a receiver is disposed on the vehicle in a position spaced away from the transmission antenna; said receiver is not directly physically connected to the transmission antenna;

wherein the handlebar lock module is operatively attached to a portion of the vehicle frame;

the receiver is operable to receive a signal from the portable transmitter and to provide input to the control unit, the receiver is separate from the control unit;

the control unit controls the transmission antenna to transmit a signal that urges the portable transmitter to transmit an identity (ID) signal to the receiver; and the handlebar lock module is operable to provide a handlebar lock cancellation operation in response to reception of the ID signal from the portable transmitter.

14. A remote control system according to claim 13, wherein the handlebar lock module further comprises a lock solenoid operably connected to the locking mechanism so as to be capable of disabling the locking mechanism, wherein the lock solenoid is controlled by the control unit such that when the receiver receives an ID signal from the portable transmitter, the control unit determines whether the ID signal is a predetermined signal; and upon determination that the ID signal is a predetermined signal, the control unit renders the lock solenoid operative to permit operation of the locking mechanism by manipulation of the knob.

15. A remote control system according to claim 13, wherein the vehicle comprises a body cover which substantially surrounds the steering handlebar, wherein the handlebar lock module is mounted within the body cover adjacent to the steering handlebar, and wherein the transmission antenna is positioned within the body cover at a position above the handlebar lock module.

16. A remote control system according to claim 13, wherein the transmission antenna is disposed proximate to the vehicle's width centerline.

17. A remote control system according to claim 13, further comprises a seat unlocking switch and a seat lock actuator, each operatively connected to the control unit.

18. A remote control system according to claim 17, wherein when the control unit confirms that an ID transmitted from the portable transmitter is a predetermined signal, the control unit operates the seat lock actuator in response to an operation of the seat unlocking switch.

19. A remote control system according to claim 13, wherein the receiver is disposed in a storage box mounted on the vehicle.

20. A remote control system according to claim 13, wherein the receiver is disposed in a riding seat of the vehicle.

* * * * *